United States Patent
Matsuo et al.

(10) Patent No.: US 10,210,900 B2
(45) Date of Patent: Feb. 19, 2019

(54) REWRITING OF DATA STORED IN DEFECTIVE STORAGE REGIONS INTO OTHER STORAGE REGIONS

(71) Applicant: KABUSHIKI KAISHA TOSHIBA, Tokyo (JP)

(72) Inventors: Takashi Matsuo, Fujisawa Kanagawa (JP); Kenji Yoshida, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 15/389,254

(22) Filed: Dec. 22, 2016

(65) Prior Publication Data

US 2017/0221519 A1   Aug. 3, 2017

Related U.S. Application Data

(60) Provisional application No. 62/290,834, filed on Feb. 3, 2016.

(51) Int. Cl.
| | |
|---|---|
| G11B 20/18 | (2006.01) |
| G06F 11/10 | (2006.01) |
| G06F 12/10 | (2016.01) |
| G06F 11/20 | (2006.01) |

(52) U.S. Cl.
CPC ...... *G11B 20/1889* (2013.01); *G06F 11/2017* (2013.01); *G06F 12/10* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 6,134,214 A | 10/2000 | Takagi et al. | |
| 6,385,744 B1 | 5/2002 | Ando et al. | |
| 6,972,917 B2* | 12/2005 | Maeda | G11B 5/012 |
| | | | 360/51 |
| 8,988,800 B1* | 3/2015 | Varnica | G11B 20/1833 |
| | | | 360/31 |

FOREIGN PATENT DOCUMENTS

JP   2005310215 A   11/2005

* cited by examiner

*Primary Examiner* — Denise Tran
(74) *Attorney, Agent, or Firm* — Kim & Stewart LLP

(57) ABSTRACT

A storage apparatus includes a storage disk including a plurality of tracks each of which includes a plurality of sectors, a head configured to write data in and read data from the storage disk, and a controller. The controller is configured to control the head to carry out reading of a group of data units from target sectors in a target track of the storage disk, the group of data units being associated with a command received from an external device, determine whether or not the target sectors include one or more defective sectors based on result of the reading, and control the head to write the group of data units in physically consecutive non-written sectors of the target track or another track, when the target sectors are determined to include the defective sectors.

18 Claims, 20 Drawing Sheets

FIG. 4

| TRACK NUMBER | SECTOR NUMBER | STORAGE STATE |
|---|---|---|
| 1 | 1 | STORED |
|  | 2 | STORED |
|  | ... | ... |
| 2 | 1 | NOT STORED |
|  | 2 | NOT STORED |
|  | ... | ... |
| ... | ... | ... |

FIG. 5

| KEY | DATA LENGTH | TRACK NUMBER | TOP SECTOR NUMBER |
|---|---|---|---|
| AAAA | 3KB | 2 | 02 |
| AABB | 10KB | 212 | 08 |
| ... | ... | ... | ... |
| BBBB | 200B | 520 | 27 |

FIG. 12

| KEY | DATA LENGTH | TRACK NUMBER | TOP SECTOR NUMBER |
|---|---|---|---|
| AAAA | 3KB | 1 | 22 |
| AABB | 10KB | 212 | 08 |
| ... | ... | ... | ... |
| BBBB | 200B | 520 | 27 |

| LBA | DATA LENGTH | TRACK NUMBER | SECTOR NUMBER | SIMULTANEOUS ACCESS FLAG |
|---|---|---|---|---|
| 01 | - | 12 | 30 | - |
| 02 | 3KB | 13 | 08 | SIMULTANEOUS ACCESS(1) |
| 03 | - | 13 | 09 | SIMULTANEOUS ACCESS(1) |
| 04 | - | 13 | 10 | SIMULTANEOUS ACCESS(1) |
| 05 | - | 13 | 11 | SIMULTANEOUS ACCESS(1) |
| 06 | - | 13 | 12 | SIMULTANEOUS ACCESS(1) |
| 07 | - | 13 | 13 | SIMULTANEOUS ACCESS(1) |
| ... | ... | ... | ... | ... |

| TRACK NUMBER/SECTOR NUMBER COMBINATION | NUMBER OF ACCESSES |
|---|---|
| TRACK 1 SECTORS 01, 02, 03 | 95 TIMES |
| TRACK 4 SECTORS 04, 05 | 70 TIMES |
| ... | ... |

73

REWRITING OF DATA STORED IN DEFECTIVE STORAGE REGIONS INTO OTHER STORAGE REGIONS

CROSS-REFERENCE TO RELATED APPLICATIONS

This application is based upon and claims the benefit of priority from U.S. Provisional Patent Application No. 62/290,834, filed on Feb. 3, 2016, the entire contents of which are incorporated herein by reference.

FIELD

Embodiments described herein relate generally to a storage apparatus and a method for storing data therein.

BACKGROUND

A storage apparatus that writes data into a storage medium such as a magnetic disk or semiconductor memory thereof is known.

BRIEF DESCRIPTION OF THE DRAWINGS

FIG. 4 shows an example of a sector management table stored in the RAM.

FIG. 5 shows an example of a key-address table according to a key-value scheme.

FIG. 12 shows an example of a key-address table updated in accordance with processing of writing a data group into other sectors.

DETAILED DESCRIPTION

A storage apparatus includes a storage disk including a plurality of tracks each of which includes a plurality of sectors, a head configured to write data in and read data from the storage disk, and a controller. The controller is configured to control the head to carry out reading of a group of data units from target sectors in a target track of the storage disk, the group of data units being associated with a command received from an external device, determine whether or not the target sectors include one or more defective sectors based on result of the reading, and control the head to write the group of data units in physically consecutive non-written sectors of the target track or another track, when the target sectors are determined to include the defective sectors.

An apparatus of the embodiment is described below, with references to the drawings. The numbers, dimensions, ratios, and processing sequences and the like of constituent elements in the following descriptions are merely exemplary, and are not restrictive.

The apparatus of the embodiments writes data into a storage area and reads data from a storage area of a storage medium such as a magnetic disk, a semiconductor memory such as NAND memory, or a magnetoresistive memory. A "storage area" refers to a part or all of a non-volatile storage medium that stores data.

If the storage medium is a magnetic disk, a "storage area" may be one or a plurality of sectors, or a part of one sector.

If the storage medium is a semiconductor memory or a magnetoresistive memory, a "storage area" may be one or a plurality of pages or clusters, or may be a part of one page or one cluster.

In the following, an apparatus and a storage medium according to embodiments may be referred to and described collectively as a storage device.

First Embodiment

Figure 1:
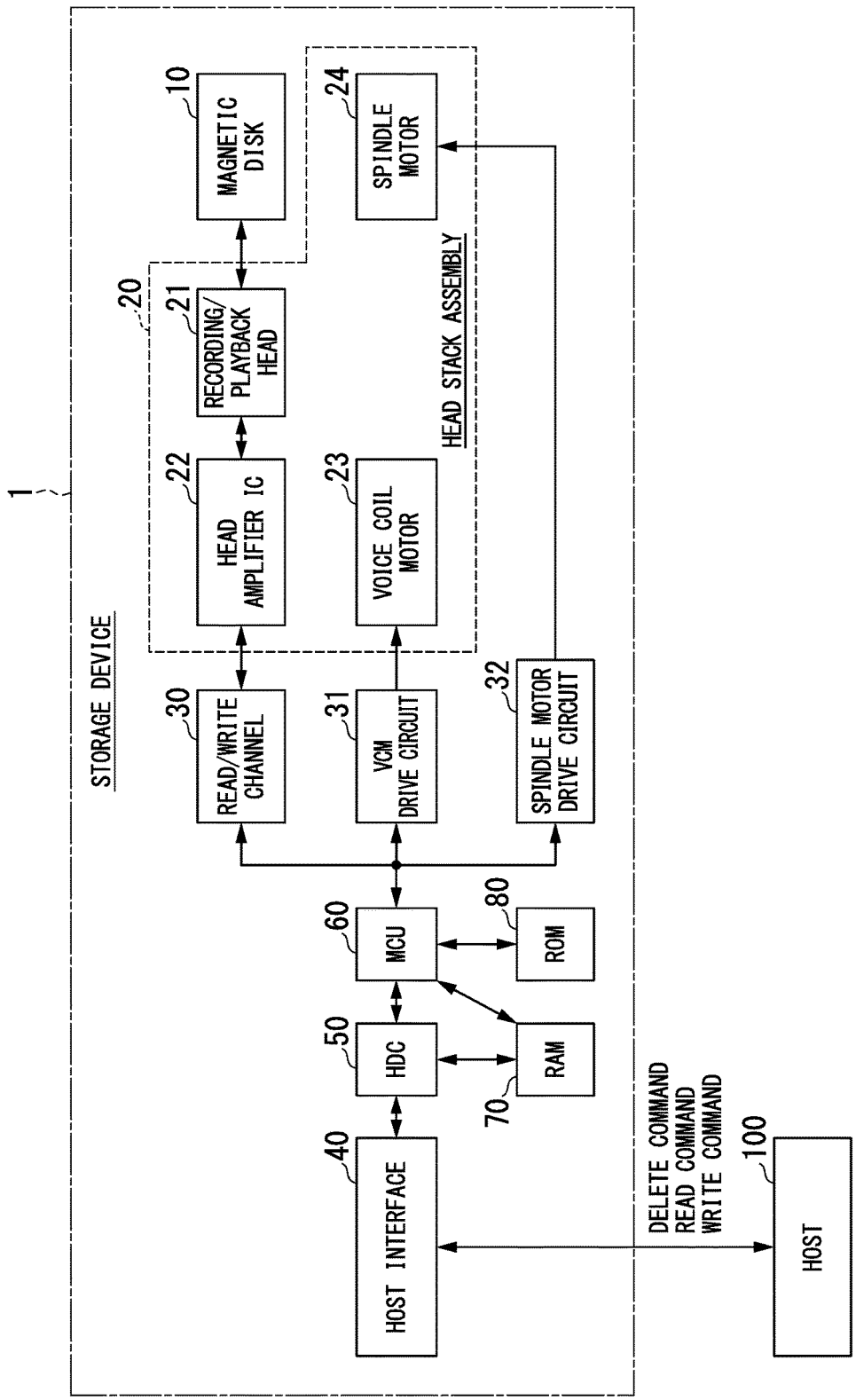
FIG. 1 is a block diagram of a storage device according to a first embodiment.

FIG. 1 is a block diagram of a storage device according to a first embodiment. The storage device 1 according to the first embodiment includes a magnetic disk 10, a head stack assembly (HSA) 20, a read/write channel 30 (indicated in the drawing as R/W channel), a VCM (voice coil motor) drive circuit 31, a spindle motor drive circuit 32, a host interface 40, an HDC (hard disk controller) 50, an MCU (microcontroller unit) 60, a RAM (random-access memory) 70, and a ROM (read-only memory) 80, but is not limited to these elements.

The head stack assembly 20 and the read/write channel 30 are one example of a "read/write module," and the HDC 50 and the MCU 60 are an example of a "controller." The read/write module may include, in addition to the head stack assembly 20 and the read/write channel 30, the VCM drive circuit 31 and the spindle motor drive circuit 32.

The storage device 1 communicates with the host (client) 100. The storage device 1, in response to a request from the host 100, writes information into the magnetic disk 10 and reads out information written in the magnetic disk 10. The host 100 may be an information processing device used by a user of the storage device 1 and may further transmit various commands to the storage device 1 based on commands and the like received from another device. The host 100 may, based on the result of internal information processing, generate and transmit various commands to the storage device 1.

The host 100 transmits to the storage device 1 commands such as read commands instructing to read data, writes commands instructing to write data, and erase commands instructing to erase data.

The host 100 may generate commands with respect to the storage device 1 according to a key-value scheme. The key-value scheme is a scheme wherein, by a command that specifies a key that identifies data and a value that is the data contents, instructions are made with respect to the storage device 1. A key is arbitrarily generated information that is not restricted by rules, and includes, for example, a serial number. In the following, the data that had been written into the storage device 1 according to instructions from the host 100 or the data that are instructed to be written are referred to as user data.

User data is data associated with keys, which are designated by commands from the host 100, and the keys may be associated with physical addresses in a key-address table 72. User data may also be data associated with LBAs, which are designated by commands from the host 100, and the LBAs may be associated with physical addresses in an LBA-address table 72A.

The magnetic disk 10 is a circular disk (platter) on which magnetic recording layers are formed on front and back surfaces of a substrate, which is made of, for example, aluminum or glass. The magnetic disk 10 may be configured as a single disk or a plurality of disks stacked in the thickness direction thereof. In the present embodiment, the magnetic disk 10 will be described as configured by a single disk. The magnetic disk 10 is an example of a "storage medium".

Figure 2:
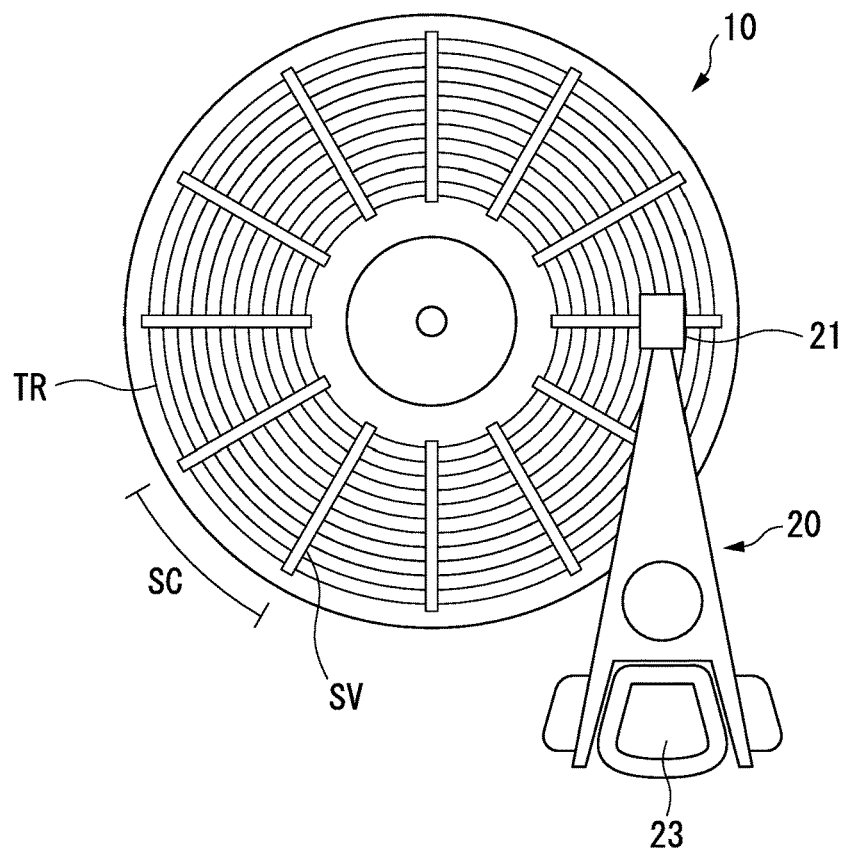
FIG. 2 schematically shows a magnetic disk of the storage device according to the first embodiment.

FIG. 2 schematically shows an example of a magnetic disk according to the first embodiment. The magnetic disk 10 includes a plurality of tracks TR. Each of the tracks TR is an area of one surface of the magnetic disk 10 that are divided by concentric circular lines. Each of the tracks TR includes a plurality of sectors SC. Each of the sectors SC is an area of a track TR divided in a radial direction extending from the center of the magnetic disk 10. The sector SC is a unit for writing and reading data. A plurality of mutually neighboring sectors SC is one example of a "physically contiguous storage area." "Physically" means "not logically."

The magnetic disk 10 also includes a servo area SV in which servo information for positioning a recording/playback head 21 is stored. The method of recording data in the magnetic disk 10 may be an in-plane recording method or a perpendicular recording method.

Returning to FIG. 1, the head stack assembly 20 includes the recording/playback head 21, a head amplifier IC 22, a voice coil motor 23, and a spindle motor 24.

The recording/playback head 21 is mounted on a head arm and moves relative to the magnetic disk 10 driven by the voice coil motor 23 while floating over the magnetic disk 10. The recording/playback head 21 may be a thin-film head of an electromagnet serving for both recording and playback, or may be a combination of a read head formed of a magnetic head using, for example, a GMR (giant magnetoresistive) or TMR (tunnel magnetoresistive) semiconductor, and a write head implemented formed of a thin-film head.

When writing user data, the recording/playback head 21, by generating a magnetic field based on an electrical signal supplied by the head amplifier IC 22, changes a magnetization direction of the magnetic recording layer of the magnetic disk 10, so that the recording/playback head 21 writes the user data on the magnetic disk 10.

When reading user data, the recording/playback head 21 generates an electrical signal corresponding to the magnetization direction of each data written region of the magnetic recording layer of the magnetic disk 10 while moving over the magnetic disk 10. The recording/playback head 21 supplies the generated electrical signal to the read/write channel 30 via the head amplifier IC 22.

The head amplifier IC 22 amplifies signal strength of the electrical signal supplied by the recording/playback head 21 and also converts the electrical signal supplied by the read/write channel 30 and supplies the converted signal to the recording/playback head 21.

The voice coil motor 23 drives the head stack assembly 20 in response to a drive current supplied by the VCM drive circuit 31. As a result, the voice coil motor 23 moves the recording/playback head 21 outward or inward between the tracks TR, along the radial direction (or along a direction at an inclination having an angle with respect to the radial direction) of the magnetic disk 10. The radial direction is a direction extending through the center of the magnetic disk.

The spindle motor 24, in response to a drive current supplied by the spindle motor drive circuit 32, rotates the magnetic disk 10. For example, the spindle motor 24 is a DC brushless motor.

The read/write channel 30 is implemented, for example, by hardware such as an LSI (large-scale integration) device, an ASIC (application-specific integrated circuit), or an FPGA (field-programmable gate array). The read/write channel 30 encodes user data supplied by the HDC 50 via the MCU 60 to a data stream of a prescribed format. The read/write channel 30 supplies the encoded data stream to the head amplifier IC 22.

The read/write channel 30 decodes an electrical signal of data read out by the recording/playback head 21 and amplified by the head amplifier IC 22 and supplies the decoded signal to the HDC 50 via the MCU 60. If DFH (dynamic flying height) control technology is adopted in the recording/playback head 21, the read/write channel 30 may supply a current to a heater that heats the recording/playback head 21.

The VCM drive circuit 31 receives a control signal from the MCU 60 and supplies a drive current to the voice coil motor 23. The spindle motor drive circuit 32 receives a control signal from the MCU 60 and supplies a drive current to the spindle motor 24.

The host interface 40 communicates with the host 100. The host interface 40 is an example of an "interface". The host interface 40 receives from the host 100 write commands that request writing of user data to the magnetic disk 10, read commands that request reading of user data from the magnetic disk 10, or other commands. For example, a write command transmitted from the host 100 includes at least a key and a value (user data), and a read command transmitted from the host 100 includes at least a key. The host 100 may transmit a write command separately from a key or value to the storage device 1. The host 100 may also transmit a read command separately from a key to the storage device 1.

The host interface 40 transmits user data read out in response to a received read command to the host 100, which is the transmission source of the read command.

The host interface 40, after performing prescribed signal processing with respect to a command received from the host 100, may supply the signal-processed command to, for example, the HDC 50, which is a subsequent stage.

The HDC 50 temporarily stores the user data included in a write command received by the host interface 40 in a write buffer (not shown) of the RAM 70. The HDC 50 also temporarily stores user data read out from the magnetic disk 10 under control by the MCU 60 in a read buffer (not shown) of the RAM 70.

The HDC 50 appends an error correction code (ECC) to the user data received from the host 100, and supplies the ECC-appended user data to the read/write channel 30. The HDC 50 uses an LDPC (low-density parity check) code, a Reed-Solomon code, a Hamming code, a block code, or a parity code or the like as the error correction code. Instead, the HDC 50 may append a CRC (cyclic redundancy check) code to the user data.

The HDC 50 performs error correction based on the error correction code included in the user data decoded by the read/write channel 30.

"Error correction" may be processing that includes processing to correct error bits in data, or processing to overwrite data in which an error was detected with other data of the same contents that had been redundantly stored in another storage area.

For example, the HDC 50 uses an error correction code to detect an error in data for each prescribed data size unit, such as bit units or byte units, so as to correct the data in which an error was detected. The concept of "error" includes errors and likely errors. That is, it is not necessary to determine whether or not an error actually occurred, and instead it is sufficient to determine whether or not an error is likely to have occurred.

The "error correction" may be executed by overwriting data in which an error was detected based on an error correction code with other data of the same contents.

The "other data of the same contents" may, for example, be stored in another storage area different from the storage area in which the data was stored, and may be stored in the same or a different storage medium.

For example, the HDC 50, based on redundant data stored in a prescribed storage area on the magnetic disk 10, recovers user data that could not be read out and overwrites the recovered user data into the sector SC in which the unreadable data are stored.

When the MCU 60 is not performing write or read processing of the user data, the HDC 50 may control the recording/playback head 21 and perform verifying. The verifying is processing whereby the storage device 1 autonomously reads out data that had been written into an arbitrary sector SC of the magnetic disk 10 and performs error correction with respect to the read-out data.

The HDC 50 may perform a reverse ECC to append an error correction code and perform error correction. The reverse ECC is a method of appending an error correction code to user data before the user data is encoded, and error correction is performed before decoding the user data.

The MCU 60 reads out or writes user data in the sequence stored in the write buffer of the RAM 70. The MCU 60 must wait until the recording/playback head 21 moves to a position over the target track TR before writing or reading out user data. Therefore, in order to increase the speed of response with respect to a command from the host 100, to minimize the movement time of the recording/playback head 21, that is, to minimize the drive amount of the voice coil motor 23, the HDC 50 may change the sequence of the user data in the write buffer.

Figure 3:
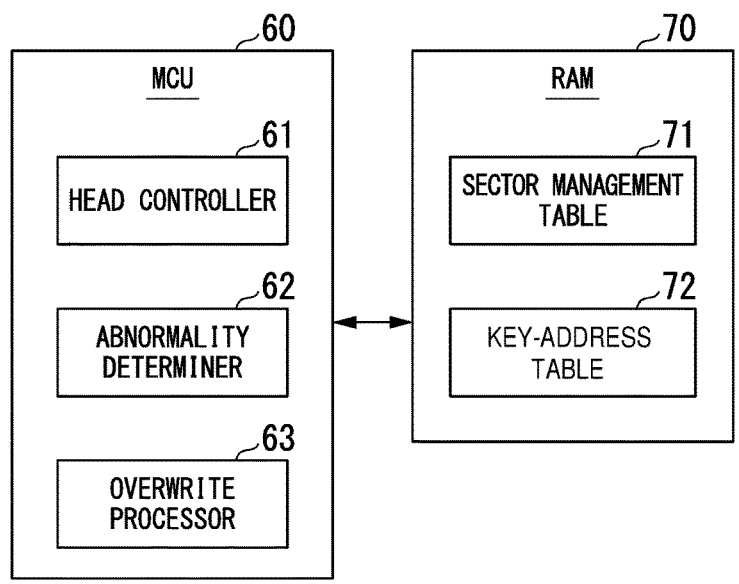
FIG. 3 shows a configuration of an MCU of the storage device and information stored in a RAM of the storage device according to the first embodiment.

FIG. 3 shows a configuration of the MCU 60 and an example of information stored in the RAM 70 in the first embodiment. The MCU 60 in the first embodiment may include a head controller 61, an abnormality determiner 62, and an overwrite processor 63, but is not limited to these elements. A part or all of the elements of the MCU 60 may be implemented by an MPU (microprocessing unit) executing a program stored in the ROM 80. A part or all of the elements of the MCU 60 may be implemented by hardware such as an LSI device, an ASIC, or an FPGA, which have circuitry for implementing the functions thereof.

The RAM 70, for example, in addition to storing user data in the write buffer, stores a sector management table 71 and the key-address table 72. The sector management table 71 and the key-address table 72 are stored in the magnetic disk 10 during the time when the power of the storage device 1 is in an off state.

The sector management table 71 and the key-address table 72 are loaded in the RAM 70 and used when the power of the storage device 1 goes into an on state, and are saved in the magnetic disk 10 when the power goes into the off state. The storage device 1 may include the sector management tale 71 and the key-address table 72 in a non-volatile memory (not shown) that holds the tables in a non-volatile manner. A non-volatile memory is, for example, a flash memory or an MRAM (magnetoresistive random-access memory).

The ROM 80 stores programs such as a booting program and firmware that are executed by the processor of the HDC 50 and the MCU 60. A part of the program may be stored on the magnetic disk 10 or in the above-described non-volatile memory.

FIG. 4 shows an example of the sector management table 71. As shown, the sector management table 71 has, for each of the sectors SC indicated by sector numbers, which is included in each of the tracks TR indicated by track numbers, information indicating the storage state, such as whether data is stored or not stored.

For example, the track number represents a physical coordinate of a track TR on the magnetic disk 10 (an ordinal number in the radial direction from the inside or the outside). The sector number represents the sector SC as the ordinal number, counting in the circumferential direction, from a reference sector SC to above a prescribed track TR specified by a track number. Therefore, the second sector SC to which a sector number is appended contiguously with respect to the number of the first sector SC is the sector SC that is physically contiguous with the first sector SC.

FIG. 5 shows an example of the key-address table 72 used in the key-value scheme. The key-address table 72 is an example of "reference information". In the key-address table 72 shown in FIG. 5, the length of user data, the track number, and the top sector number are associated with keys that specified by commands. The top sector is the sector SC having the smallest sector number of the sectors SC into which data associated with a key are written. In the following, a set of sectors SC into which user data associated with one key will sometimes be called a sector group SG. Although data associated with one key is written into one track TR in FIG. 5, data associated with one key may be written across a plurality of tracks TR. In this case, a plurality of sets of combinations of the track number and the sector number of the top sector may be associated with one key.

The head controller 61 moves the recording/playback head 21 to a position over a target sector SC in response to a command received via the host interface 40. When moving the recording/playback head 21 to the position over the target sector SC, the head controller 61 controls the recording/playback head 21 to read out servo information from the servo area SV on the track TR and controls the recording/playback head 21 to be at the position over the magnetic disk 10. The servo information includes a track number, a sector number, and a burst signal for positioning.

For example, if the head controller 61 moves the recording/playback head 21 to a desired sector SC specified by a command, the head controller 61 first controls the spindle motor drive circuit 32 to rotate the magnetic disk 10 and controls the recording/playback head 21 to read out servo information from the servo area SD on the track TR at which the recording/playback head 21 is positioned. The head controller 61, based on the servo information read out from two adjacent servo regions (the most recent one and the immediately previous one), computes the relative speed of movement of the recording/playback head 21 with respect to the magnetic disk 10.

The head controller 61 computes the distance between the track TR including recently read-out servo information and the track TR including the desired sector SC, and determines a target speed of the recording/playback head 21 in accordance with the computed distance. The head controller 61 determines a drive current to be supplied to the voice coil motor 23, based on the determined target speed and the computed relative speed of movement. The head controller 61 controls the VCM drive circuit 31 to supply the determined drive current to the voice coil motor 23. In this manner, the head controller 61 controls the speed of the recording/playback head 21.

After the recording/playback head 21 moves to the position over the target track TR, the head controller 61 waits for the desired sector SC to rotate to the position of the recording/playback head 21. When the desired sector SC reaches the position of the recording/playback head 21, the head controller 61 controls the recording/playback head 21 to perform processing of read, write, erase, or the like, in accordance with the command with respect to this desired sector SC.

Until the desired sector SC reaches the writing position of the recording/playback head 21, because the head controller 61 maintains the position above the track TR including the desired sector SC, the servo information is read out to the recording/playback head 21 from the servo area SV on this track TR. The head controller 61, based on a waveform pattern (signal level, pulse width, or the like) of a burst signal in the read-out servo information, adjusts the drive amount of the voice coil motor 23. By doing this, the head controller 61 maintains the positions of the recording/playback head 21 at the position over the center line of the track TR, (the line that divides each track area into two along the circumferential direction of the magnetic disk 10).

[Write Processing]

Processing by the head controller 61 when a write command is received via the host interface 40 will be described below. If the head controller 61 receives a write command via the host interface 40 specifying a new key, the head controller 61 determines a sector SC into which user data will be written, based on data length specified by the write command. A new key is a key that is not registered in the key-address table 72. The head controller 61, based on the data length of the user data and the storage capacity of each sector SC, computes the number of sectors required and determines whether or not a number of physically contiguous free areas that include at least the number of these sectors exist on the magnetic disk 10. A free area is one or more storage areas in which data can be written. If the recording medium is the magnetic disk 10, a free area is one or more sectors SC (free sectors) in which data can be written. The head controller 61 determines whether an area is free by referencing the sector management table 71. If the data length is not included in the write command, the head controller 61 may calculate the data length by referencing the starting address and the ending address of the RAM 70 when the user data (values) are stored into the RAM 70 by the HDC 50 or the MCU 60.

If the number of free sectors SC with contiguous numbers is at least the required number of sectors, user data are written into a set of one or more sectors SC having the contiguous sector SC numbers. The head controller 61 then updates the sector management table 71 and the key-address table 72.

If user data corresponding to a new key are written in the magnetic disk 10, the head controller 61 adds a data stream in the key-address table 72 in which the new key, the data length of the user data (value), the written track number, and the sector number of the top sector SCh are associated with each other. The head controller 61 then, in the sector management table 71, updates the storage state of the sector number of the sector SC in which the user data corresponding to the new key were written as "Stored".

If the host interface 40 receives a write command that specifies a key existing in the key-address table 72 along with new user data, the head controller 61 overwrites the sector SC set (sector group SG) corresponding to the existing key with the new user data.

[Read Processing]

Processing by the head controller 61 when a read command is received via the host interface 40 will be described below. If the head controller 61 receives a read command via the host interface 40, the head controller 61 references the key-address table 72 using the key specified by the read command and determines whether or not the key included in the read command exists in the key-address table 72.

If the key exists in the key-address table 72, the head controller 61 controls the recording/playback head 21 to sequentially read out user data from all of the sectors SC corresponding to the key. The head controller 61 then causes the read-out user data to be transmitted to the HDC 50 via the read/write channel 30.

For example, the head controller 61 references the track number and the sector number of the top sector SCh corresponding to the key in the key-address table 72 and specifies the top sector SCh of the sector group SG in which user data had been written. Then, the head controller 61 controls the recording/playback head 21 to sequentially read out of user data from the sector group SG starting at the top sector SC. If the key does not exist in the key-address table 72, the head controller 61 controls the host interface 40 to transmit an error response to the host 100.

The head controller 61 transfers a data set (hereinafter referred to as a "data group") including the user data read out from the sector group SG to the host interface 40 via the HDC 50. A "data group" is a set of a plurality of data units stored or that will be stored in different storage areas. The host interface 40 transmits user data to the host 100 that is the transmission source of the read command.

[Abnormality Determination and Overwriting Processing]

Processing by the abnormality determiner 62 and the overwrite processor 63 will be described below. The abnormality determiner 62, based on the reading state of user data by the recording/playback head 21, determines whether or not an error is included in data read from in any sector SC within a sector group SG.

For example, if user data cannot be read out through attempts of reading the user data an established number of times, which is two or more, from the same sector SC while the magnetic disk 10 is rotating, the abnormality determiner 62 may determine that the sector SC is defective. For example, when the established number of times is three times, the "user data could not be read out the established number of times" includes a case in which user data could not be read out the first three attempts but the user data could be read out on the fourth attempt.

If, as a result of error correction by the HDC 50 based on an error correction code, the number of error bits in user data corrected by the error correction is at least a threshold, the abnormality determiner 62 may determine that the sector SC is defective. That is, the state in which an error has been detected may be a state in which error correction has been executed for each prescribed data size, such as in units of bits or of bytes, at least one time or an established number of times.

The HDC 50 counts the number of corrected error bits during the process of error correction and stores the counted number in the RAM 70. The abnormality determiner 62 references the information stored in the RAM 70 and acquires the number of corrected error bits.

In the same manner when verifying is done by the HDC 50, the abnormality determiner 62 determines whether or not the sector SC is defective.

If the abnormality determiner 62 determines that the sector SC is defective, the overwrite processor 63 controls the recording/playback head 21 to write (overwrite with) a data group that had been written in the sector group SG including the sector SC that stores the user data including the error (hereinafter referred to the abnormal (defective) sector SCe) into a set of one or more physically contiguous sectors SC (that does not include the abnormal sector SCe) in the same track TR. The data group that had been written into the sector group SG that includes the abnormal sector SCe includes, for example, at least a part or all of the user data that had been written into the abnormal sector SCe, and a part or all of the user data that had been written into one or a plurality of sectors SC different from the abnormal sector SCe and that is associated with the user data written into the abnormal sector SCe.

"User data associated with the user data that had been written into the abnormal sector SCe" is user data that are, for example, made to correspond to the same key information as user data that had been written into the abnormal sector SCe. That is, the "user data associated with the user data that had been written into the abnormal sector SCe" are user data, for which an instruction is made for writing that specifies the same key as the user data that had been written into the abnormal sector SCe. The user data that had been written into the abnormal sector SCe is an example of "first data," and the user data associated with user data that had been written into the abnormal sector SCe are an example of "second data." The user data that had been written into the abnormal sector SCe and the user data associated with user data that had been written into the abnormal sector SCe are written in sectors SC which are physically contiguous with each other in the write processing or the overwrite processing by the overwrite processor 63. Therefore, a data group includes data that has been written into the sectors SC which are physically contiguous with the abnormal sector SCe.

This data group may further include user data or other data such as servo information, which are not associated with the user data (first data) that had been written in the abnormal sector SCe. "User data not associated with the user data that had been written in the abnormal sector SCe" are, for example, user data corresponding to a key that differs from that of the user data that had been written in the abnormal sector SCe. Here, even if the servo area SV is between sector groups SG, the sectors SC in sector groups SG are taken to be contiguous with each other.

Figure 6:
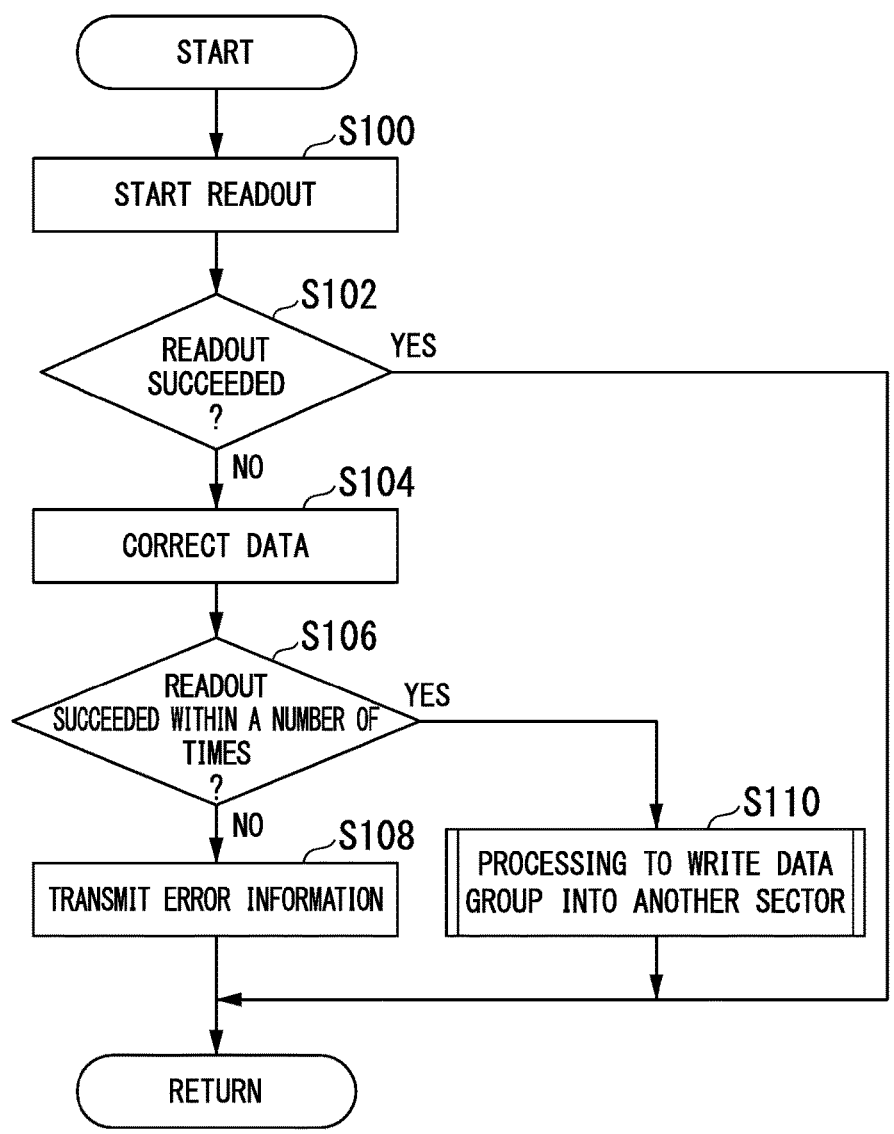
FIG. 6 is a flowchart showing an example of processing carried out by the storage device according to the first embodiment.

FIG. 6 is a flowchart showing an example of processing by a storage device according to the first embodiment. The processing of this flowchart starts, for example, when a read command is received by the host interface 40 from the host 100, or when verifying is performed.

First, the head controller 61 controls the recording/playback head 21 to start the readout of user data from a sector group SG starting from the top sector SCh, based on a data length corresponding to a key of a read command received via the host interface 40 (step S100).

Next, the abnormality determiner 62 determines whether or not the user data could be read out from the sector group SG (step S102). If the determination is that the user data could be read out, the abnormality determiner 62 determines that there are no abnormalities in any sector SC within the sector group SG that is the readout target and ends the processing of this flowchart.

If, however, the abnormality determiner 62 does not determine that user data could be read out, the HDC 50 performs error correction of the user data and recovers the user data, based on the error correction code included in the user data (step S104).

For example, if the user data cannot be recovered even by performing error correction, the head controller 61 controls the recording/playback head 21 to maintain its position over the same track TR and controls the spindle motor drive circuit 32 to rotate the magnetic disk 10 at a prescribed rotational speed while reading out user data from the readout target sector SC each time the magnetic disk 10 rotates. During the repeated readout processing by the head controller 61, the HDC 50 tries to perform error correction each time.

Next, the abnormality determiner 62 determines whether or not the user data could be read out within a prescribed number of times of readout processing performed repeatedly by the head controller 61 (step S106). If the abnormality determiner 62 determines that the user data could not be read out within the prescribed number of times of readout processing, the HDC 50 transmits to the host 100, via the host interface 40, error information indicating that user data corresponding to the read command could not be read out (step S108).

If, however, the abnormality determiner 62 determines that the user data could be read out within the prescribed number of readout processing attempts, the abnormality determiner 62 determines that the sector SC is defective.

When the abnormality determiner 62 detects any defective sector within the readout target sector group SG, the overwrite processor 63 performs processing to write the data group that had been written into the sector group SG that includes the abnormal (defective) sector SCe into a sector group that does not include any abnormal sectors and is physically contiguous within the same track TR (S110). As described above, a data group that has been written in the sector group SG that includes the abnormal sector SCe includes first data written in the abnormal sector SCe and second data associated with the same key as the first data in the key-address table 72.

Figure 7:
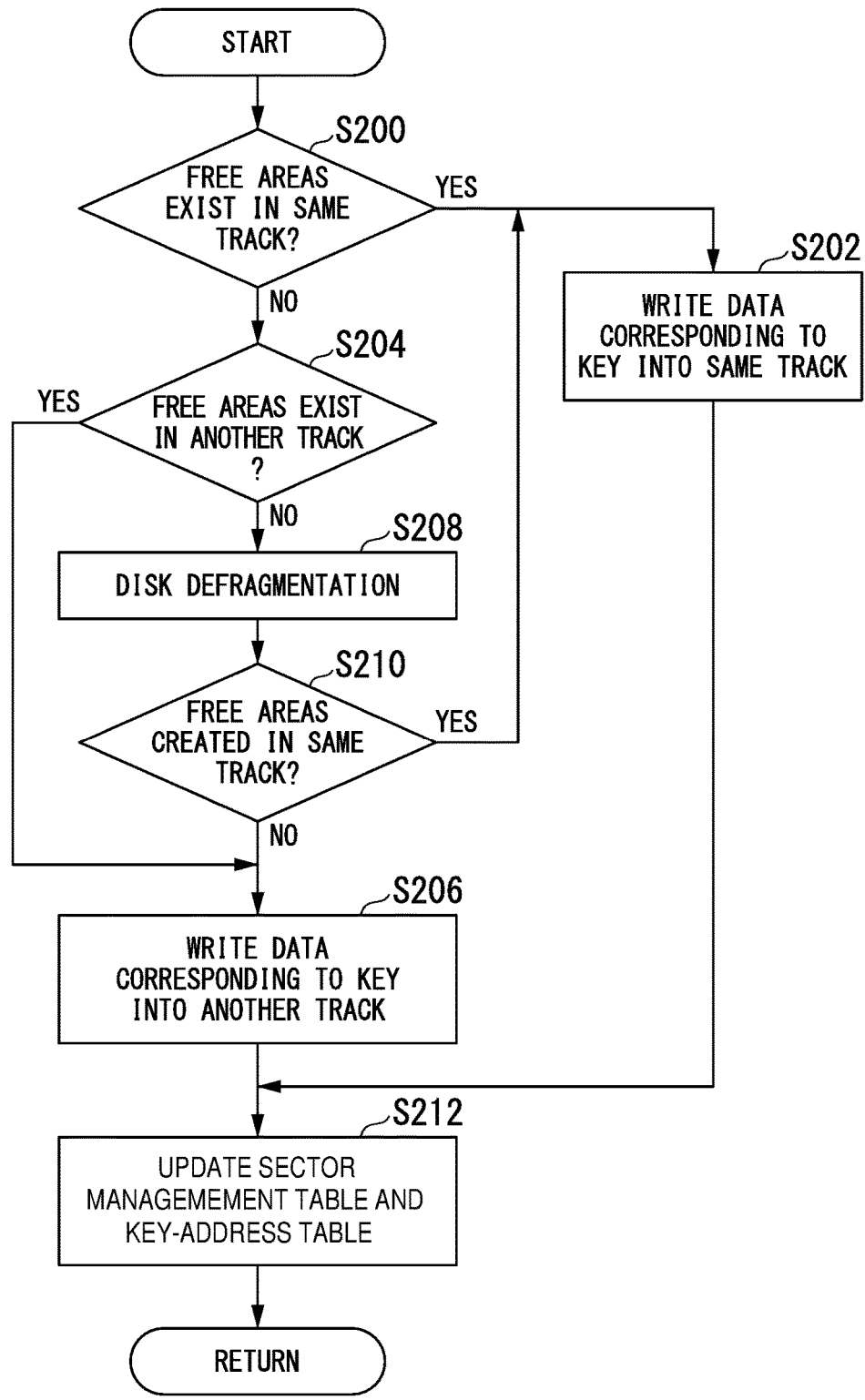
FIG. 7 is a flowchart showing an example of the processing of writing a data group that had been written in a sector group including an abnormal sector into sectors that are contiguous in the circumferential direction of a magnetic disk.

FIG. 7 is a flowchart showing an example of the processing of writing a data group that had been written into a sector group that includes the abnormal sector into sectors that are contiguous in the circumferential direction of the magnetic disk. The processing of this flowchart corresponds to the step S110 of the above-described flowchart shown in FIG. 6.

First, the overwrite processor 63 determines whether or not, in the same track TR as the sector group SG that includes the abnormal sector SCe, a number of contiguous free areas exist that is at least same as the number of sectors SC of the sector group SG (step S200). If the determination is that the contiguous free areas exist in the same track TR, the overwrite processor 63 controls the recording/playback head 21 to write the data group that had been written in the sector group SG corresponding to the key (the sector group SG that includes the abnormal sector SCe) into the physically contiguous free areas in the same track TR (step S202). In this case, "control" refers to processing, for example, to read out or recover a data group that has been written in a sector group SG, to write the read-out or recovered data group into the RAM 70, and to write the data group that was written in the RAM 70 into the contiguous free area in the track TR.

Figure 8:
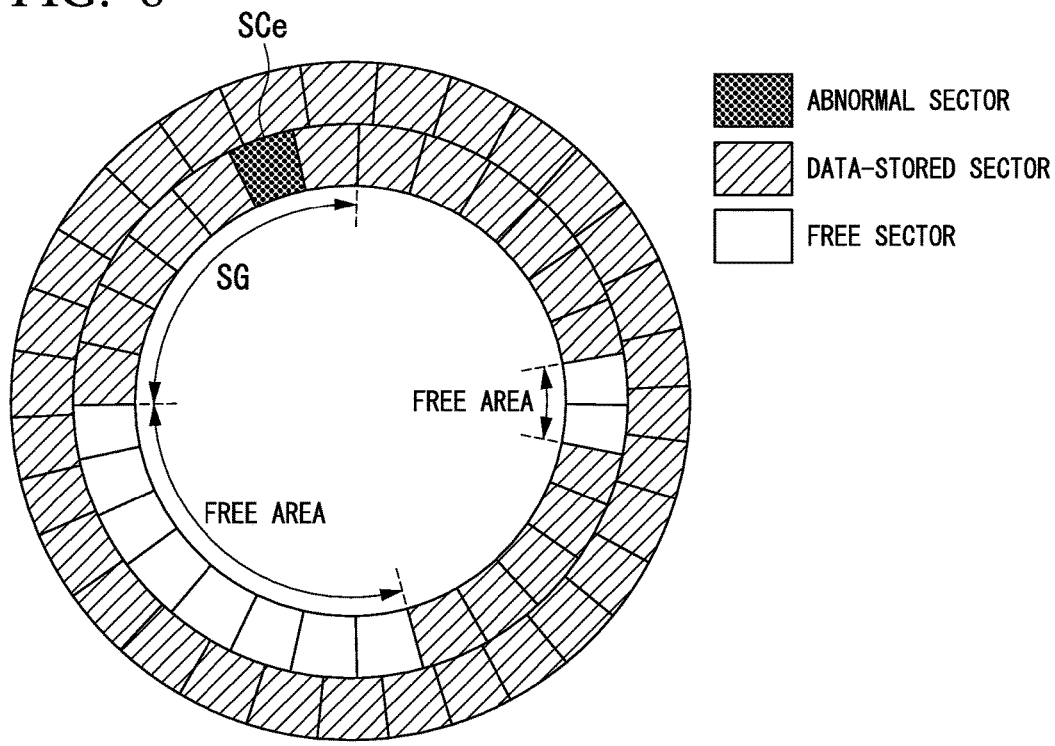
FIGS. 8 and 9 show, in schematic form, processing of writing a data group into other sectors.
Figure 9:
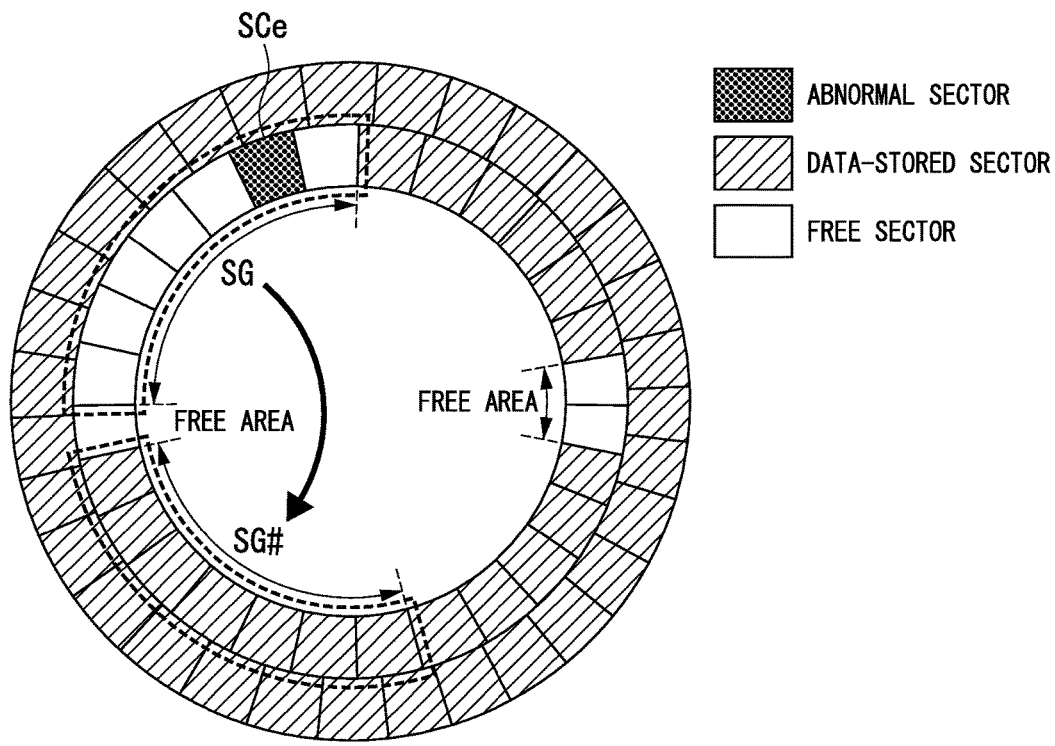

FIG. 8 and FIG. 9 show, in schematic form, the processing to write a data group into another sector. As shown in FIG. 8, an abnormal sector SCe is included in the sector group SG. Then, the overwrite processor 63 determines whether or not a physically contiguous free area of at least seven sectors of the section group SG exists in the same track TR. In FIG. 8, a physically contiguous free area of eight sectors exists in the same track TR. For this reason, as shown in FIG. 9, the overwrite processor 63 controls the recording/playback head 21 to write the data group that had been written in the sector group SG into the physically contiguous free area. In the following, a sector group that includes the abnormal sector SCe may be indicated by the reference symbol SG, and a set of sectors SC in which a data group was overwritten will sometimes be indicated by the reference symbol SG#.

Returning to FIG. 7, if the determination made at step S200 is that no sufficient physically contiguous free area exists within the same track TR, the overwrite processor 63 determines whether or not a physically contiguous free area of at least the number of sectors SC in the sector group SG exists within another track TR (step S204). If the determination is that sufficient physically contiguous free area exists within another track TR, the overwrite processor 63 controls the recording/playback head 21 to write the data group written in the sector group SG corresponding to the key into the physically contiguous free area within another track TR (step S206).

Figure 10:
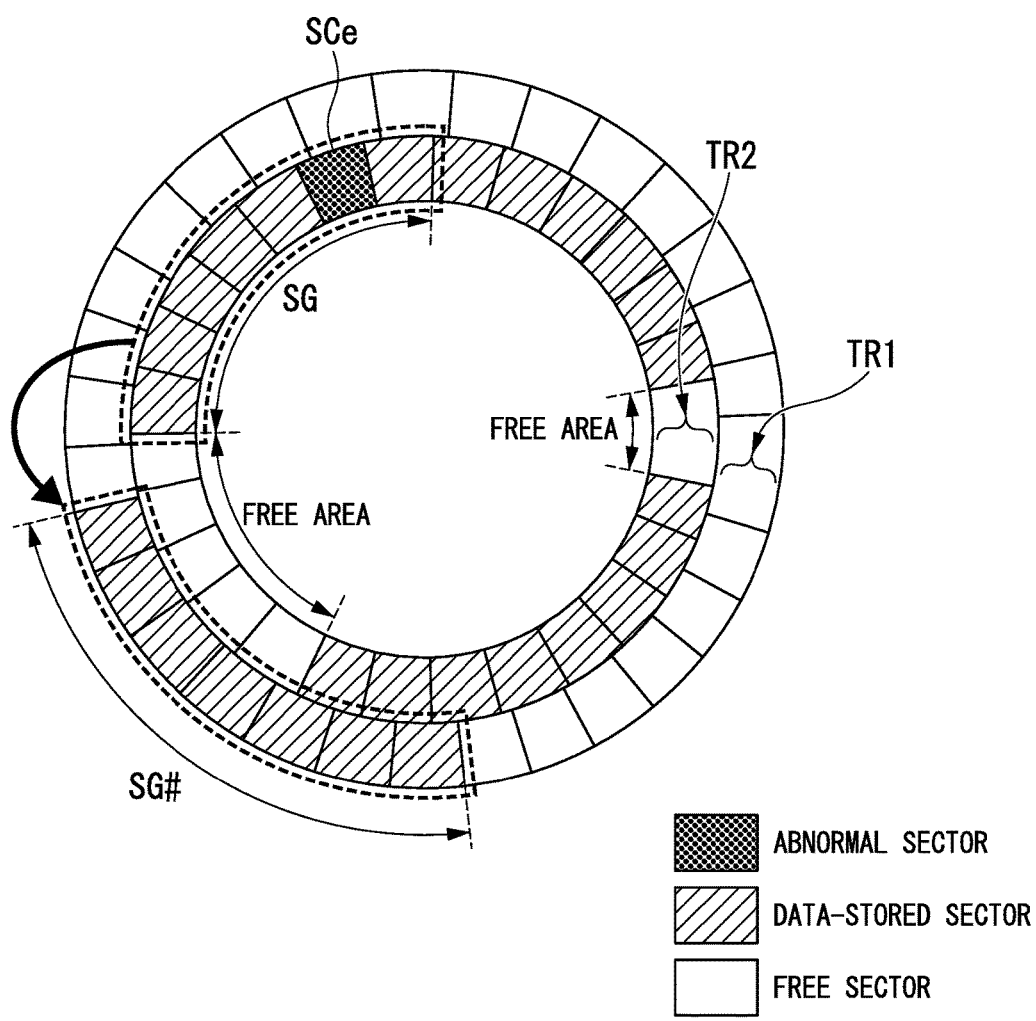
FIG. 10 shows, in schematic form, processing of writing a data group into other sectors when there is no contiguous free area within the same track.

FIG. 10 shows, in schematic form, the processing to write a data group into another sector when there is no sufficient physically contiguous free area within the same track. In FIG. 10, no sufficient physically contiguous free area exists the track TR2 equal to or more than the number of sectors in the sector group SG that includes the abnormal sector SCe. In this case, the overwrite processor 63, for example, may write user data in a track TR1 adjacent to a track TR2 in the radial direction of the magnetic disk 10. In this case, the term radial direction may be either the direction toward the outside or the direction toward the inside.

For example, the overwrite processor 63 determines whether or not a physically contiguous free area of at least the number of sectors of the sector group SG including an abnormal sector SCe exists within the track TR1 adjacent to the track TR2. In FIG. 10, because there is a physically contiguous free area of at least the number of sectors of the sector group SG within the track TR1, the abnormality determiner 62 causes the data group that had been written in the sector group SG to be written into the physically contiguous free area within this track TR1.

The track TR in which the data group is written may be set to a track TR positioned on the outside in the radial direction with respect to the track TR that includes the abnormal sector SCe, or a track TR that is positioned on the inside with respect to the track TR.

Returning to the description of FIG. 7, if the determination made at step S204 is that the contiguous free area does not exist in another TR, the overwrite processor 63 performs defragmentation processing (perform disk defragmentation) of the magnetic disk 10 to increase the number of physically contiguous free areas (step S208).

Figure 11:
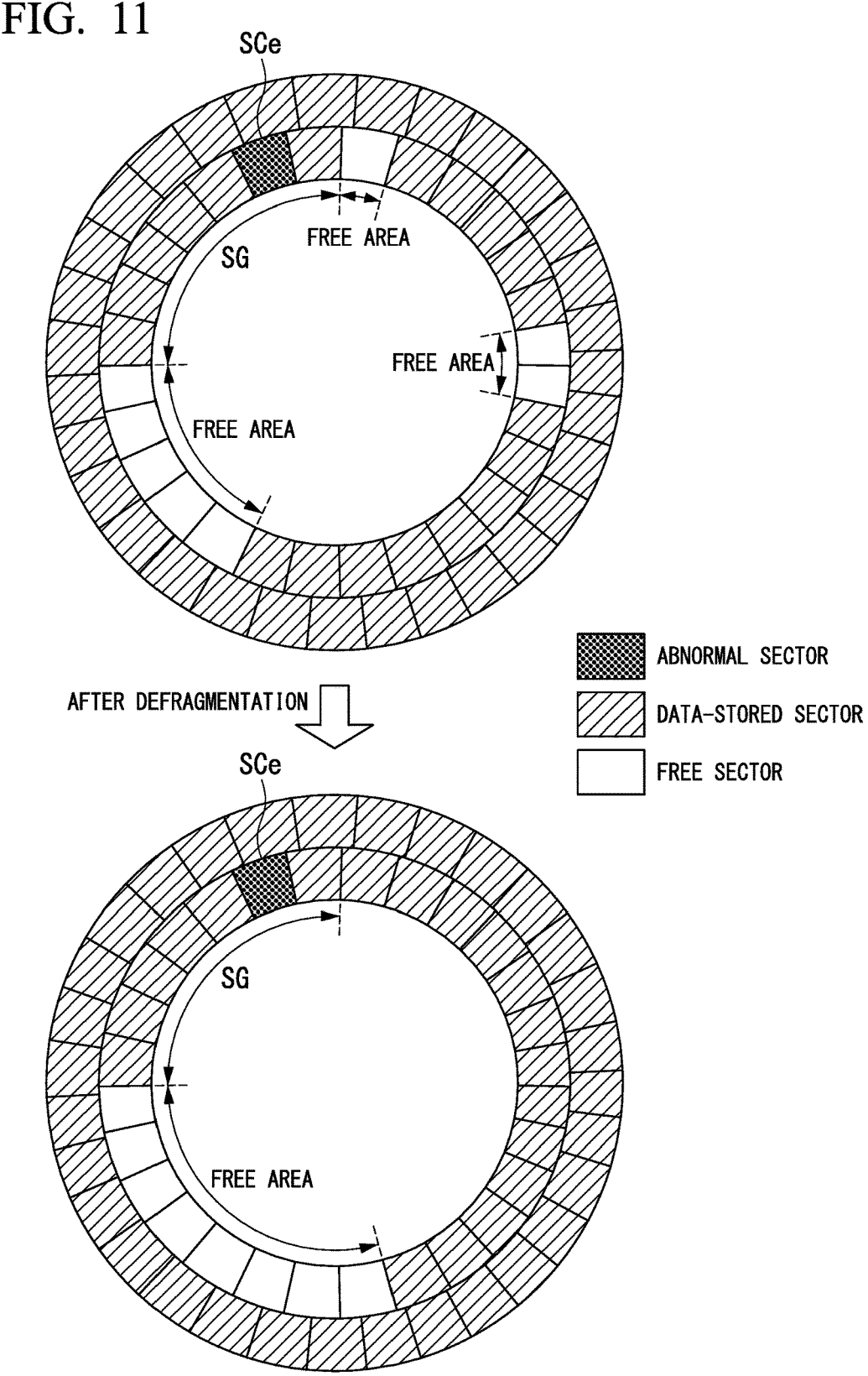
FIG. 11 shows, in schematic form, the increase in the number of contiguous free areas by defragmentation of data in a magnetic disk.

FIG. 11 shows, in schematic form, the increase in the number of contiguous free areas by defragmentation of a magnetic disk. For example, the overwrite processor 63 repositions data in order to group data that was fragmented into clumps. "Repositioning of data" is processing to rewrite data that had been already written in a sector SC into a free sector SC and freeing up the sector SC in which data had originally been written to create a physically contiguous free area.

"Freeing up" refers, for example, the overwriting of the storage state corresponding to a sector number of a sector SC with "Not stored" in the sector management table 71, so that new data can be written into the sector SC having the overwritten storage state. "Freeing up" may include processing to actually write a prescribed data into a sector SC into which data had been written, so as to erase the data.

Returning to FIG. 7, after performing disk defragmentation, the overwrite processor 63 determines whether or not a physically contiguous free area of at least the number of sectors of the sector group SG was created within the same track TR as the sector group SG including an abnormal sector SCe. If the determination is that the physically contiguous free area of at least the number of sectors of the sector group SG was created in the same track TR, the overwrite processor 63 performs the processing of step S202.

If, however, the determination is that the physically contiguous free area of at least the number of sectors of the sector group SG was not created in the same track TR, the overwrite processor 63 performs the processing of step S206.

If the overwrite processor 63 ends the processing to write a data group into another sector SC, the overwrite processor 63 updates the sector management table 71 and the key-address table 72 (step S212).

If a data group has been moved to a physically contiguous free area within the same track TR, the overwrite processor 63, in the key-address table 72, updates the sector number of the top sector SCh with the sector number of the sector SC of the movement destination. The overwrite processor 63 updates, in the sector movement table 71, the storage state corresponding to the sector number of the movement destination sector SC as "Stored" and also overwrites the storage state corresponding to the sector number of the sector group SG from which the abnormal sector SCe will be removed as "Not stored".

If the data group has been written into to the physically contiguous free areas in the other track, the overwrite processor 63, in the key-address table 72, overwrites the track number with the track number of the movement destination and also overwrites the sector number of the top sector SCh with the sector number of the sector SC of the movement destination.

FIG. 12 shows an example of the key-address table 72 updated in accordance with processing to write a data group into another sector. For example, if the overwrite processor 63 has moved user data corresponding to the key "AAAA" in the key-address table 72 shown in FIG. 5 from the track TR2 to a contiguous free area in the track TR1, which is adjacent to the track TR2, the overwrite processor 63 updates the track number 2 with the track number 1 of the movement destination and also updates the sector number 02 of the top sector SCh with the sector number 22 of the movement destination sector SC.

If the overwrite processor 63 has ended the processing to write the data group into another sector SC, in order to prohibit the writing of data with respect to the abnormal sector SCe, the overwrite processor 63 may fix the storage state corresponding to the sector number of the abnormal sector SCe in the sector management table 71 as "Stored".

Figure 13:
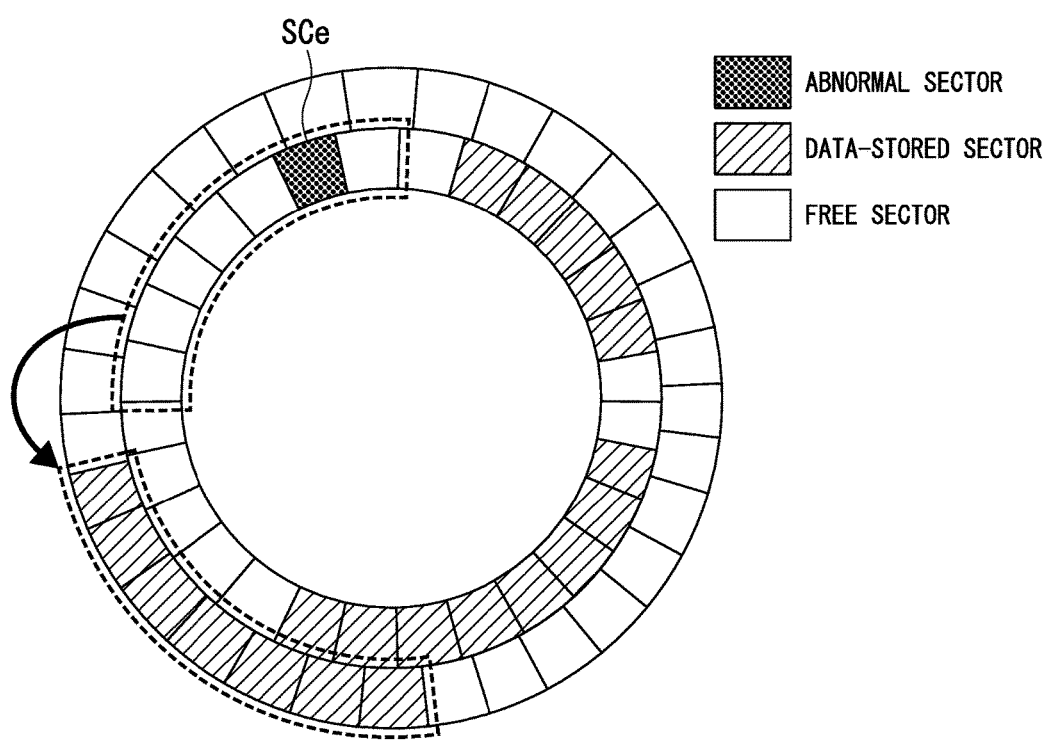
FIG. 13 shows the result of the processing of writing user data into other sectors according to the first embodiment.

FIG. 13 shows the result of processing to write user data into another sector according to the first embodiment. As shown in FIG. 13, in the first embodiment, a data group that had been written into a sector group SG including an abnormal sector SCe is rewritten into a physically contiguous sector SC that does not include an abnormal sector SCe.

According to the first embodiment described above, because a data group including at least first data that are at least a part of data that have been written in an abnormal sector SCe in which an error was detected and second data that are at least a part of data that has been written in a sector SC that is physically contiguous with the abnormal sector SCe are written into at least one sector SC different from the abnormal sector SCe, when reading out the next data group, it is possible to reduce the possibility of the occurrence of further seeking (movement) of the recording/playback head 21 after the recording/playback head 21 is moved to a desired sector SC. As a result, the storage device 1 in the first embodiment can improve the responsiveness to read commands received from the host 100.

[Modified Example of the First Embodiment]

A modified example of the first embodiment will be described below. If the overwrite processor 63 in the above-described first embodiment determines that a physically contiguous free area having at least the number of sectors of the sector group SG including an abnormal sector SCe does not exist on any track TR, the overwrite processor 63 may store the data group that had been written in the sector group SG across tracks TR that are contiguous in the radial direction of the magnetic disk 10.

Figure 14:
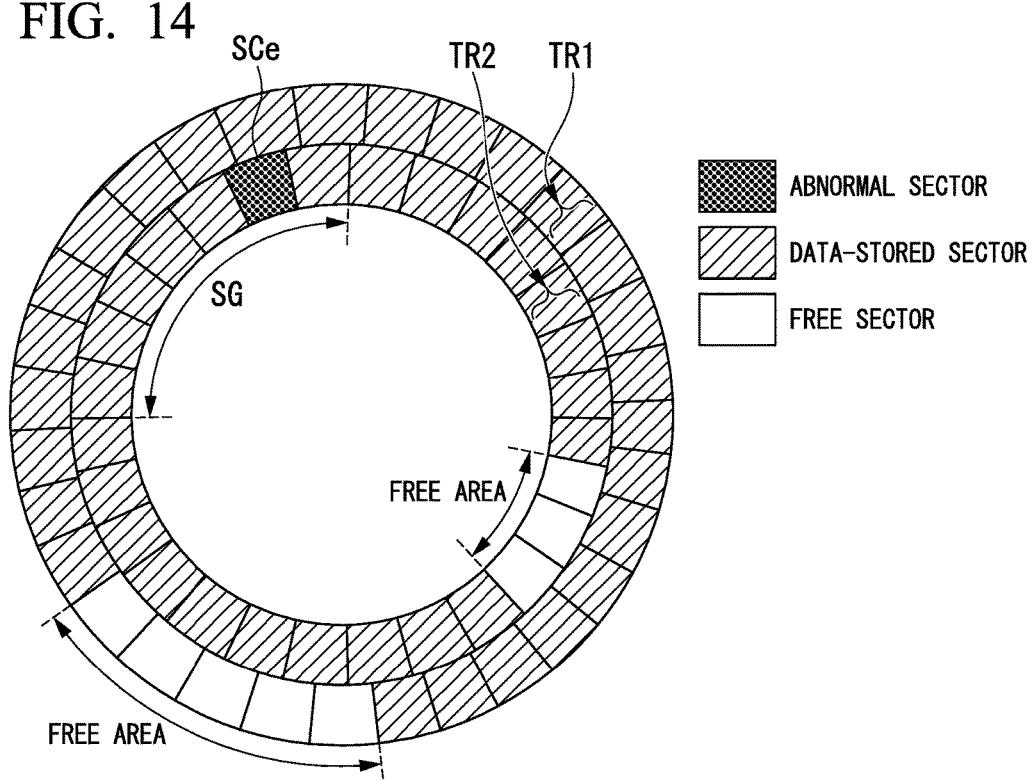
FIGS. 14 and 15 show, in schematic form, processing of writing a data group across tracks that are contiguous in the radial direction of the magnetic disk.
Figure 15:
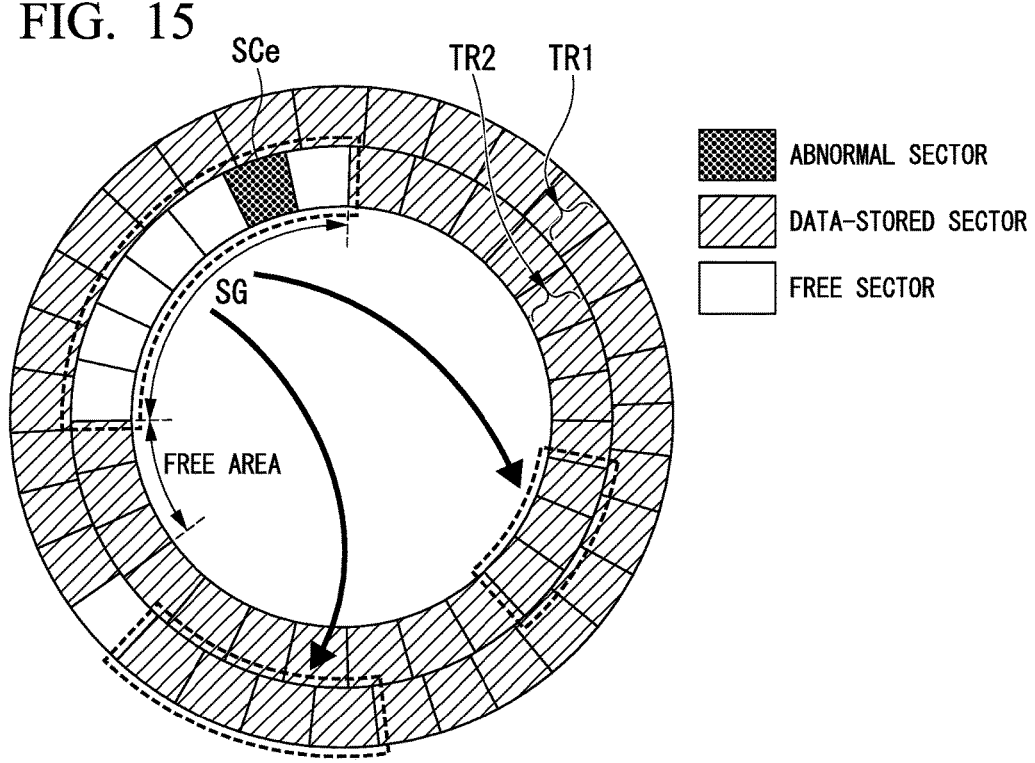

FIG. 14 and FIG. 15 show, in schematic form, the processing to write a data group across tracks that are contiguous in the radial direction of a magnetic disk. In FIG. 14, no physically contiguous free area of the seven sectors of the sector group SG or more exists within the track TR2 including an abnormal sector SCe, and there is a contiguous free area of only three sectors. Also, it is assumed that there is no 7-sector free area on any track TR. In this case, the overwrite processor 63 determines whether or not a physically contiguous free area for the remaining four sectors exists within the neighboring track TR1. In FIG. 14, a physically contiguous free area of five sectors exists within the track TR1. As a result, the overwrite processor 63, as shown in FIG. 15, divides the data group that had been written in the sector group SG between a physically contiguous free area of three sectors within the track TR2 and a physically contiguous free area of four sectors within the track TR1, so as to write the divided data groups (hereinafter referred to as "sub-data groups."

Additionally, even if one entire track TR is free, if a data group does not fit into one track TR, the overwrite processor 63, in the same manner, may divide the data group into sub-data groups and write the sub-data groups across a plurality of tracks TR.

The overwrite processor 63 may calculate or estimate the amount of processing time or processing burden required for defragmentation and, if the calculated or estimated processing time or processing burden is greater than a threshold, may not perform defragmentation, but rather divide the data group into sub-data groups and write the sub-data groups across a plurality of tracks TR.

Second Embodiment

A storage device 1A according to a second embodiment will be described below. The storage device 1A according to the second embodiment is different from the one according to to the first embodiment in that, if it is possible to write user data that had been written in an abnormal sector SCe into the same track TR, only the user data that had been written into the abnormal sector SCe is rewritten into a free area in the same track TR. The following description will focus on this difference and will omit descriptions of common features.

Figure 16:
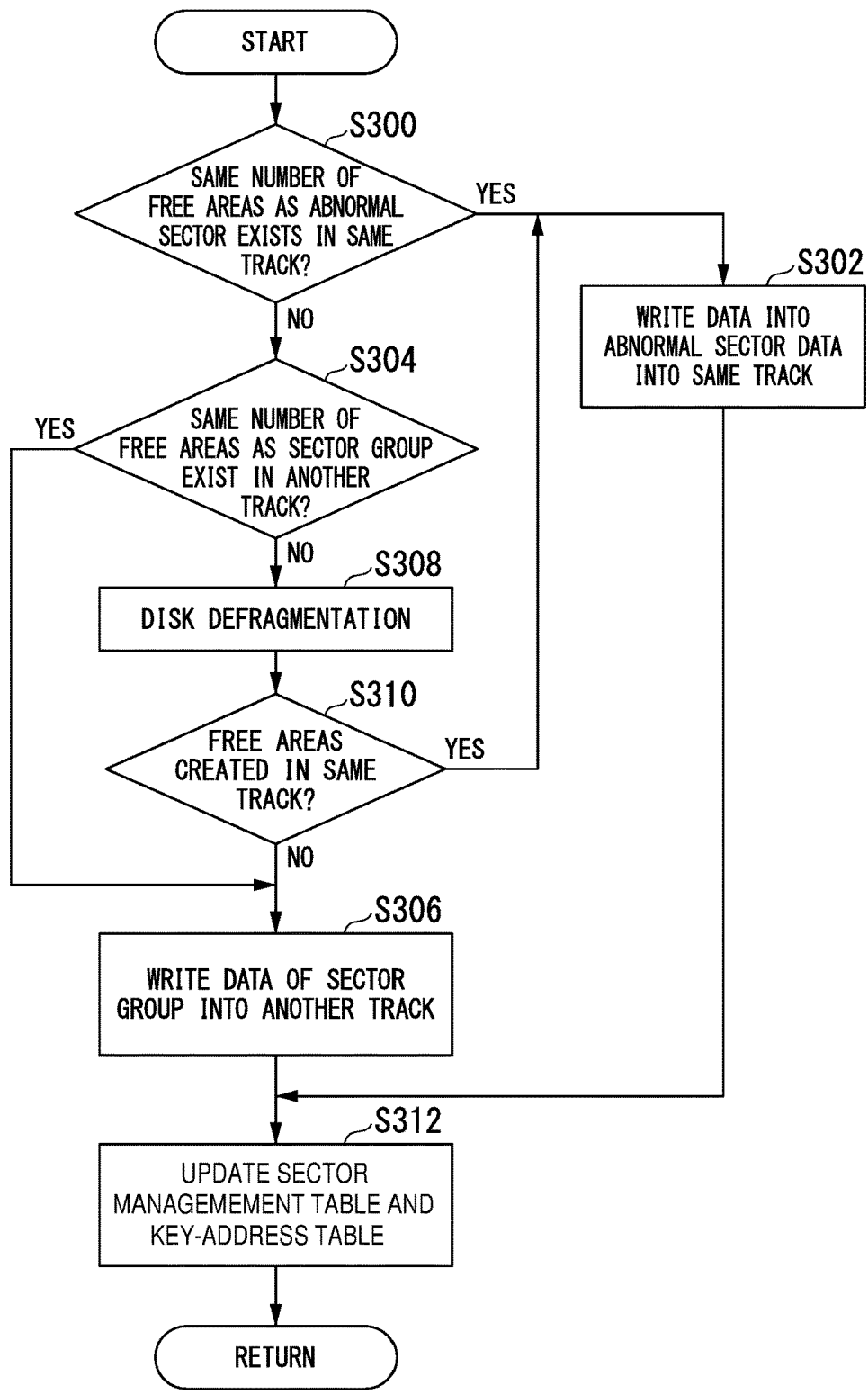
FIG. 16 is a flowchart showing an example of processing carried out by a storage device according to a second embodiment.

FIG. 16 is a flowchart of processing by the storage device 1A according to the second embodiment. The processing of this flowchart corresponds to the processing of step S110 of the flowchart shown in FIG. 6.

First, the overwrite processor 63 determines whether or not, in the track TR that includes the abnormal sector SCe, a number of free areas the same as the number of sectors having the abnormal sector SCe exist (step S300). If the determination is that the same number of free areas having the same number of sectors exists within the same track TR, the overwrite processor 63 controls the recording/playback head 21 to write the user data that had been written into the abnormal sector SCe into the free area in the same track TR (step S302).

Figure 17:
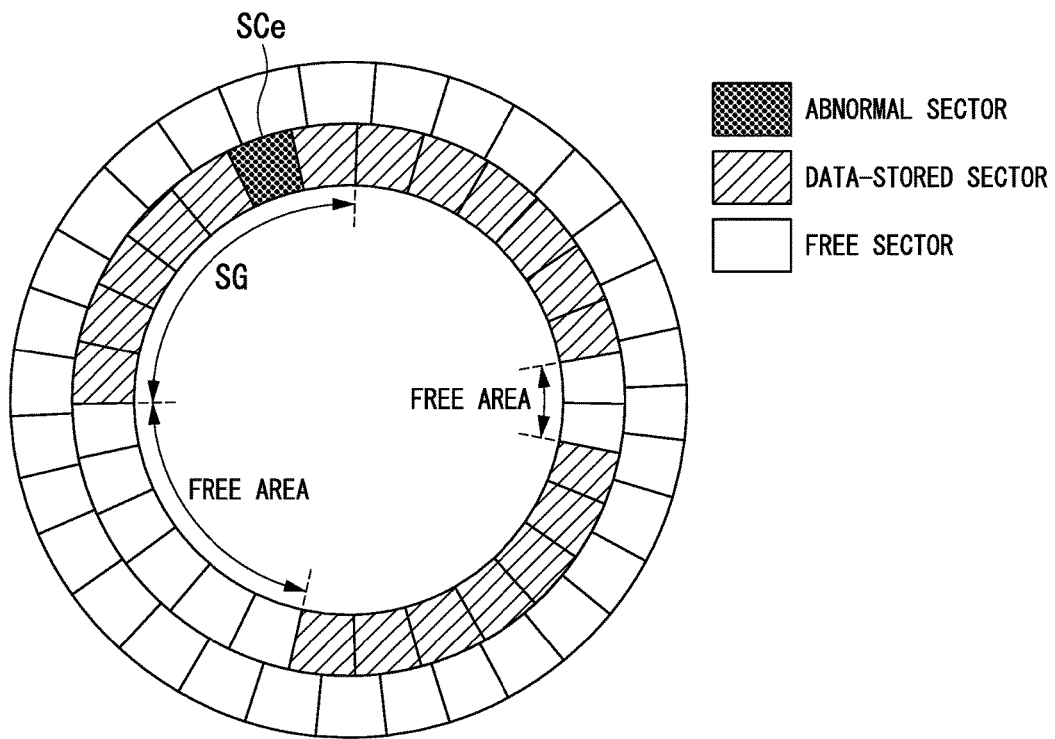
FIGS. 17 and 18 show processing of writing only the user data that had been written in an abnormal sector within a track.
Figure 18:
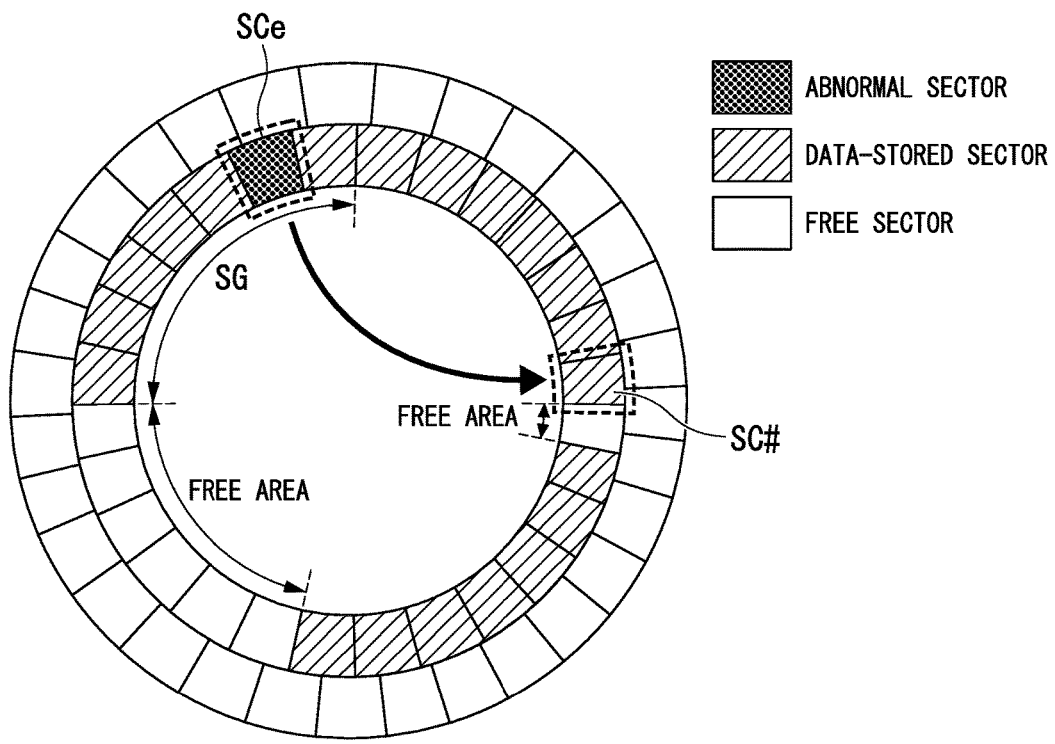

FIG. 17 and FIG. 18 show the writing within a given track of only the user data written in an abnormal sector. FIG. 17 shows that one abnormal sector SCe within the magnetic disk 10. In this case, for example, the overwrite processor 63, as shown in FIG. 18, writes only the user data that had been written in the abnormal sector SCe into one free area (indicated as SC# in the drawing) of the same track TR.

If, however, the determination is that a number of free areas having the same number of sectors does not exist within the same track TR, the overwrite processor 63 determines whether or not there is a number of physically contiguous free areas that is the same as the number of sectors in the sector group SG that includes the abnormal sector SCe in another track TR (step S304). If the determination is that there is a number of physically contiguous free areas that is the same as the number of sectors in the sector group SG in another track TR, the overwrite processor 63 controls the recording/playback head 21 to write the data group that had been written in the sector group SG into the free areas of the other track TR (step S306).

Figure 19:
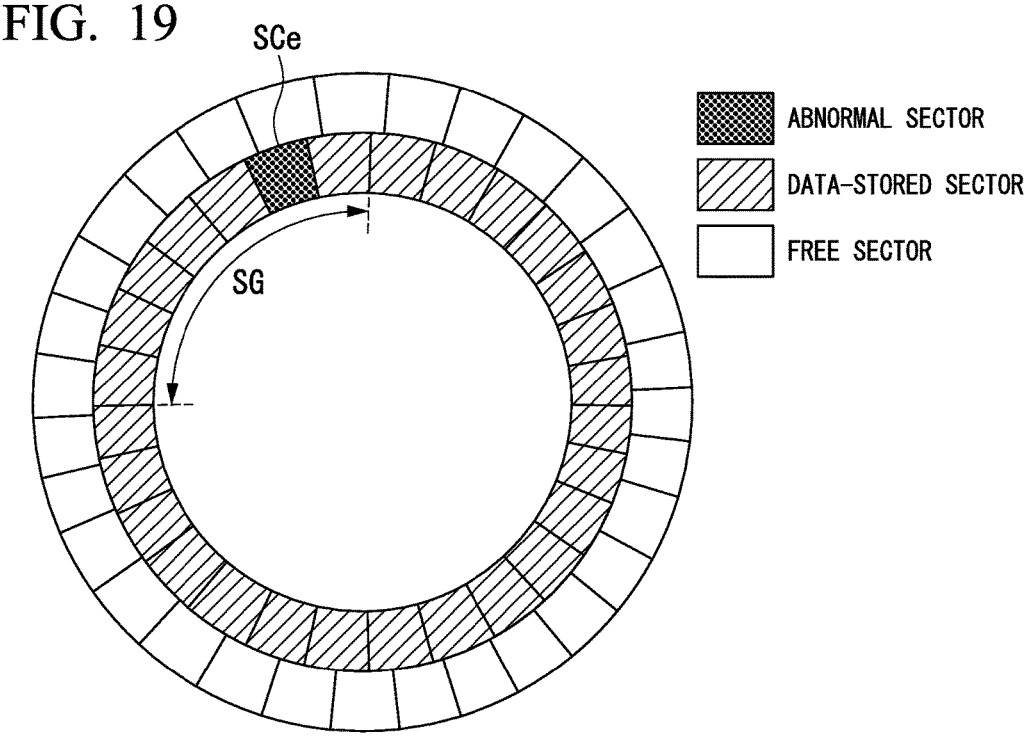
FIGS. 19 and 20 show processing of writing a data group that had been written in a sector group including an abnormal sector into a neighboring track.
Figure 20:
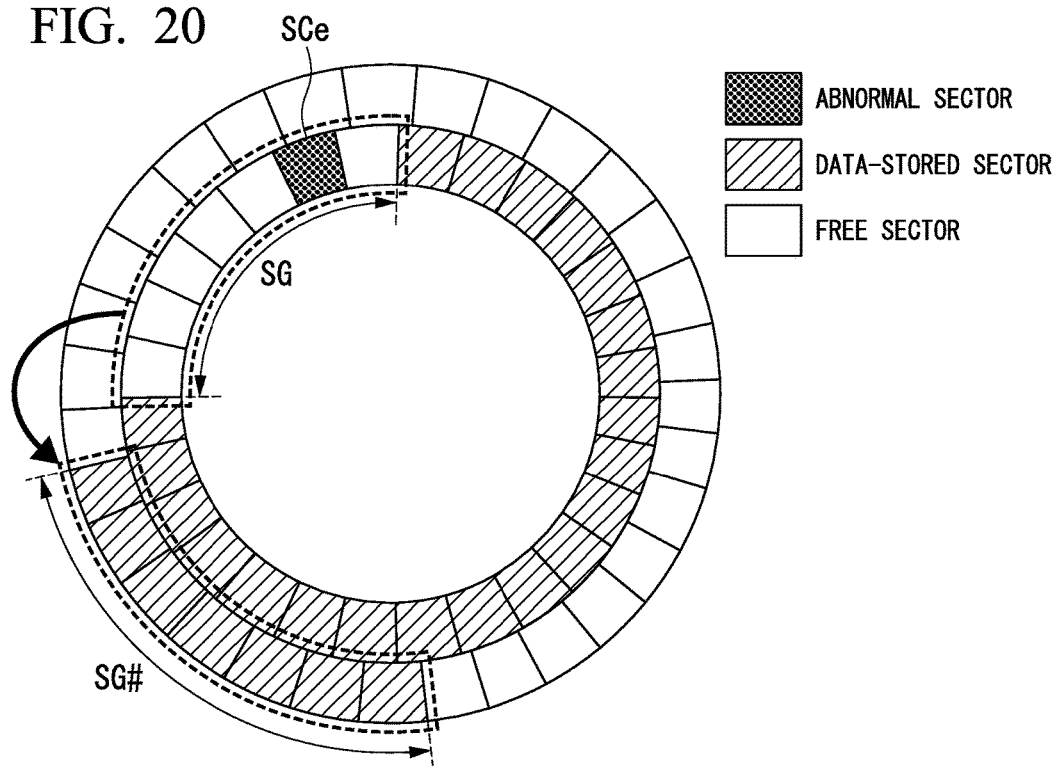

FIG. 19 and FIG. 20 show the writing of a data group that had been written in a sector group including an abnormal sector into a neighboring track. FIG. 19 shows that there is not a number of free areas that is the same as the number of sectors in the sector group SG within the same track TR as the sector group SG and that there is a number of free areas in a neighboring track TR that is the same as the number of sectors of the sector group SG. In this case, for example, the overwrite processor 63, as shown in FIG. 20, writes the data group that had been written in the sector group SG that includes the abnormal sector SCe into a physically contiguous free area in a neighboring track TR.

If, however, the determination is that there is not a number of free areas that is the same as the number of sectors in the sector group SG within another track TR, the overwrite processor 63 does processing to perform defragmentation of the magnetic disk 10 and increase the number of contiguous free areas (step S308).

Next, the overwrite processor 63 determines whether or not a number of free areas that is the same as the number of sectors in the sector group SG that includes the abnormal sector SCe have been created in the same track TR that includes the abnormal sector SCe (step S310). If the determination is that a number of free areas that is the same as the number of sectors of the abnormal sector SCe in the same track has been created, the overwrite processor 63 performs the processing of step S302.

If, however, the determination is that a number of free areas that is the same as the number of sectors of the abnormal sector SCe within the same track TR have not been created, the overwrite processor 63 performs the processing of step S306. Next, if the writing of the user data that had been written into the abnormal sector SCe or the data group that had been written into the sector group SG has been completed, the overwrite processor 63 updates the sector management table 71 and the key-address table 72 (step S312) and ends the processing of this flowchart.

According the second embodiment of the present invention, if a number of free areas that is the same as the number of sectors of the abnormal sector SCe exist within the same track TR, the overwrite processor writes the first data that had been written in the abnormal sector SCe into the free area within the same track TR, and, if a number of free areas that is the same as the number of sectors of the abnormal sector SCe does not exist within the same track TR, the overwrite processor writes a data group including at least the first data and the second data into at least one sector SC that is different from the abnormal sector SCe. This enables the storage device 1A according to the second embodiment, similarly to the one according to the first embodiment, to improve the responsiveness to read commands received from the host 100.

Third Embodiment

A storage device 1B according to a third embodiment will be described below. The storage device 1B according to the third embodiment is different from the ones according to the first and second embodiments in that communication of commands including an address that is in accordance with an LBA scheme is done with the host 100 and that data specified by a fixed data length is read and written. The following description will focus on these differences and will omit descriptions of common features.

Figures 21, 22:
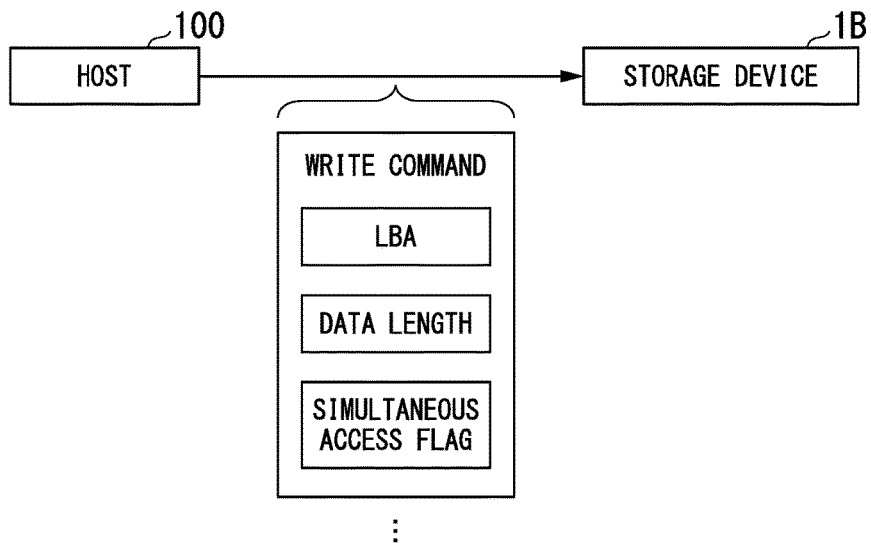
FIG. 21 shows an example of contents of a write command received from a host according to the LBA scheme.
FIG. 22 shows an example of a LBA-address table according to the LBA scheme.

FIG. 21 shows an example of the contents of a write command received from a host according to the LBA scheme. In the third embodiment, the write command received from the host 100 includes an LBA, the data length of data to be written into or read out from a sector SC specified by the LBA, and a simultaneous access flag indicating simultaneous access.

The simultaneous access flag is a flag indicating that the host 100 simultaneously writes user data or reads out user data across a plurality of sectors SC. The simultaneous access flag includes, for example, an identifier that can identify the user data. Data that have been written into sectors SC for which the simultaneous access flag has been set are treated as being mutually associated.

Upon receiving a write command via the host interface 40, the MCU 60 generates and stores into the RAM 70 the LBA-address table 72A such as shown by example in FIG. 22.

FIG. 22 shows an example of an address table by LBAs used in the LBA scheme. The LBA-address table 72A is another example of reference information. In the example shown, in the LBA-address table 72A, the length of the user data, the track number, the sector number, and the simultaneous access flag are associated with LBAs.

If a read command in accordance with the LBA scheme is received via the host interface 40, the head controller 61 references the LBA-address table 72A and determines whether or not the simultaneous access flag is set with respect to the sector number corresponding to the LBA of the read command. If the simultaneous access flag is set, the head controller 61 causing the readout of user data from the sectors SC indicated by all the sector numbers for which the simultaneous access flag is set. In FIG. 22, because the simultaneous access flag is set for the sector numbers 02 to 07, the head controller 61 has the recording/playback head 21 simultaneous readout of user data from the sectors SC of these sector numbers. Processing such as this need not be done, in which case the host 100 issues a plurality of commands for user data for which the simultaneous access flag had been set beforehand so as to simultaneously write or read out the user data.

If the command according to the LBA scheme received via the host interface 40 is a read command, or if verification is performed, the abnormality determiner 62 determines whether or not an error has been detected in any sector SC for which the simultaneous access flag is set. If the determination is that a sector SC for which the simultaneous access flag is set is defective, the overwrite processor 63 writes the data group that had been written into the sector group SG for which the simultaneous access flag is set into physically contiguous sectors SC within the same track TR that does not include an abnormal sector SCe, in the same manner as in the first embodiment.

If the storage device 1B according to the third embodiment, such as in the modification example of the first embodiment, determines that a physically contiguous free area of the number of sectors of the sector group SG that includes the abnormal sector SCe does not exist in any track TR, the data group that had been written into the sector group SG may be written across a plurality of tracks TR contiguous in the radial direction of the magnetic disk 10. Also, if, as in the second embodiment, it is possible to write user data that had been written in the abnormal sector SCe into the same track TR, the user data alone that had been written into the abnormal sector SCe may be moved to a free area of the same track TR.

If any sector SC for which information has been appended indicating simultaneous access is determined to be defective, the storage device 1B according to the third embodiment writes the first data that had been written into an abnormal sector SCe and the second data for which the same simultaneous access flag is appended as the first data into physically contiguous sectors SC within the same track TR. As a result, the storage device 1B in the third embodiment can improve the responsiveness to read commands received from the host 100.

Fourth Embodiment

A storage device 1C according to a fourth embodiment will be described below. The fourth embodiment is different from those according to the first to third embodiments in that the storage device 1C of the fourth embodiment determines, based on a read command received from the host 100, whether or not data are associated between sectors SC. The following description will focus on this difference and will omit descriptions of common features.

Figures 23, 24:
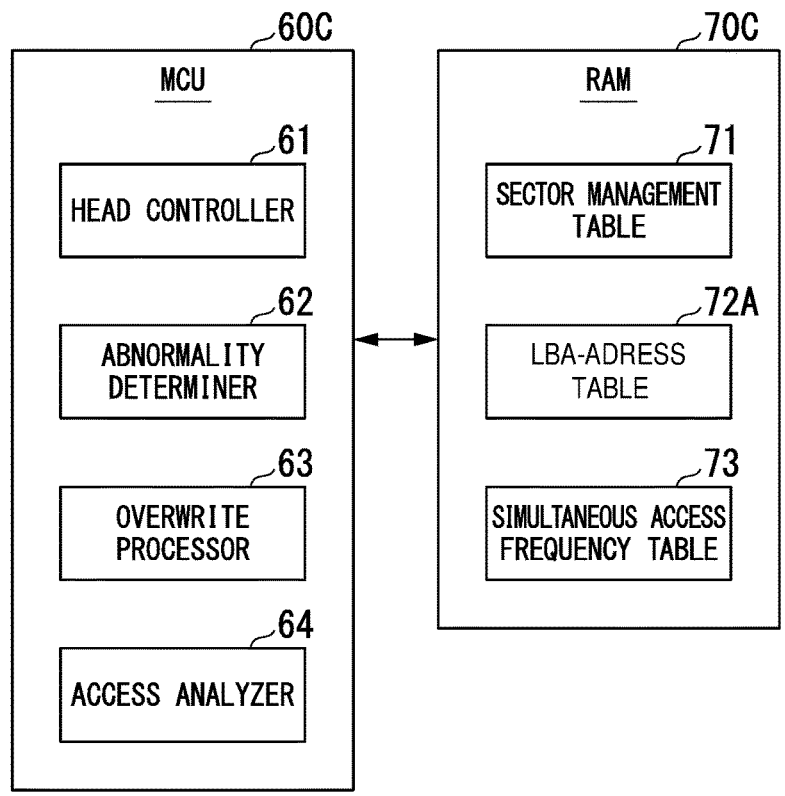
FIG. 23 shows a configuration of an MCU according to a fourth embodiment.
FIG. 24 shows an example of a simultaneous access frequency table according to the fourth embodiment.

FIG. 23 shows a configuration of an MCU according to the fourth embodiment.

The MCU 60C in the fourth embodiment, in addition to the above-described head controller 61, abnormality determiner 62, and overwrite processor 63, includes an access analyzer 64. A RAM 70C, in addition to the above-described sector management table 71 and the LBA-address table 72A, stores a simultaneous access frequency table 73. Although the storage device 1C in the fourth embodiment will be described as communicating commands with the host 100 in accordance with an LBA scheme, this is not a restriction, and communication of commands in accordance with a key-value scheme may be performed, in which case the RAM 70C may include the key-address table 72.

The access analyzer 64 determines whether or not data are associated between sectors SC, based on the contents of a read command received via the host interface 40. For example, if an address in accordance with the LBA scheme is specified to communicate with the host 100, when a read command including an LBA scheme is received, the access analyzer 64 determines whether or not there is a read command that is, with high frequency, received simultaneously with or in succession with the read command including the LBA. "Received in succession" may mean, for example, being received within a prescribed period of time and may mean being received subsequently within a prescribed period of time (without any other intervening commands). If the determination is made that there is a read command that is frequently received simultaneously or in succession, the access analyzer 64 determines that there is association between the data between the pluralities of sectors SC corresponding to the LBAs included in the read command. For example, the access analyzer 64 references the simultaneous access frequency table 73 stored in RAM 70C to determine whether or not there is association between the data.

FIG. 24 shows an example of the simultaneous access frequency table. The simultaneous access frequency table 73 is another example of reference information. The access analyzer 64 counts and registers in the simultaneous access frequency table 73 the number of receptions for each combination of track number and sector number indicating a sector SC corresponding to LBA received simultaneously via the host interface 40 or each combination of track number and sector number indicating a sector SC corresponding to LBA received successively via the host interface 40. Of the combinations of track numbers and sector numbers registered in the simultaneous access frequency table 73, the access analyzer 64 associates data in sets of sectors SC indicated by combinations having a number of receptions that are at least a threshold value.

The abnormality determiner 62 determines whether or not any sector SC of a set of sectors SC in which data associated by the access analyzer 64 is to be stored is defective. If the abnormality determiner 62 determines that any sector SC of the set of sectors SC is defective, the overwrite processor 63 controls the recording/playback head 21 to write the user data that had been written in the set of sectors SC into physically contiguous sectors SC within the same track TR.

First, the storage device 1C in the fourth embodiment performs processing the same as in the above-described flowchart shown in FIG. 6 and, if the determination is that any sector SC within a sector group SG that is the target of reading is defective, the storage device 1C performs the processing of the flowchart shown in FIG. 25, which is described below.

Figure 25:
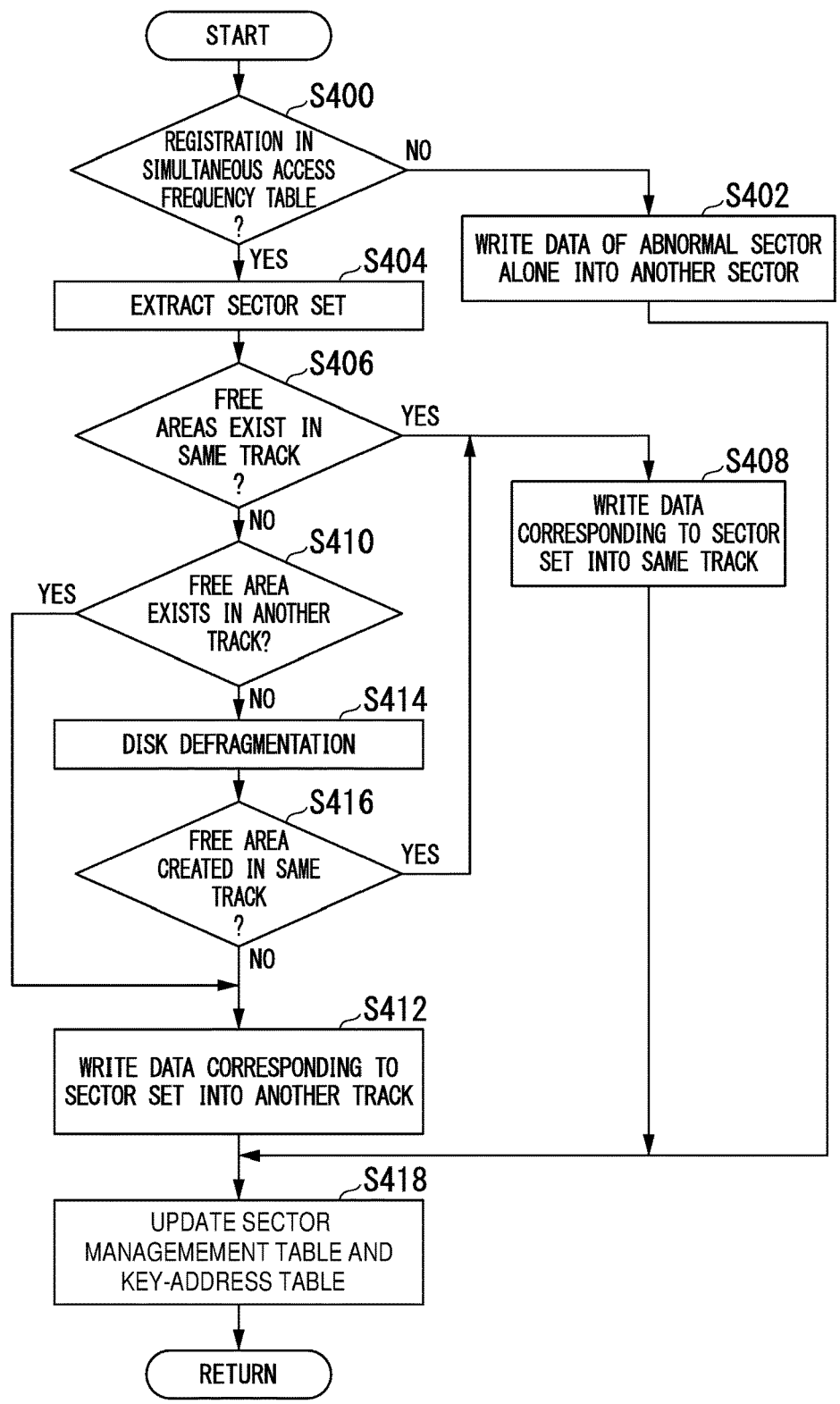
FIG. 25 is a flowchart showing an example of processing carried out by a storage device according to the fourth embodiment.

FIG. 25 is a flowchart showing an example of the processing by the storage device 1C according to the fourth embodiment. The processing of this flowchart corresponds to step S110 in the above-described flowchart shown in FIG. 6.

First, the overwrite processor 63 determines whether or not the track number and the sector number indicating an abnormal sector SCe are registered in the simultaneous access frequency table 73 (step S400). If the determination is that the track number and the sector number indicating an abnormal sector SCe are not registered in the simultaneous access frequency table 73, the overwrite processor 63 controls the recording/playback head 21 to write the user data alone that had been written in the abnormal sector SCe into a free area within the same track TR or a free area within another track TR (step S402).

If, however, the determination is that the track number and the sector number indicating an abnormal sector SCe are registered in the simultaneous access frequency table 73, the overwrite processor 63 extracts a set of sectors SC that include the abnormal sector SCe from the simultaneous access frequency table 73 (step S404). Next, the overwrite processor 63 determines whether or not a number of physically contiguous free areas that is the same as the number of sectors SC making up the extracted set of sectors SC exist in the same track TR as the abnormal sector SCe (step S406).

If the determination is that a number of physically contiguous free areas that is the same as the number of sectors SC forming the set of sectors SC exist in the same track TR, the overwrite processor 63 controls the recording/playback head 21 to write the user data that had been written into the set of sectors SC into a physically contiguous free areas within the same track TR (step S408).

If, however, the determination is that a number of contiguous free areas that is the same as the number of sectors SC forming the set of sectors SC does not exist in the same track TR, the overwrite processor 63 determines whether or not a number of physically contiguous free areas that is the same as the number of sectors SC forming the extracted set of sectors SC exist in another track TR (step S410).

If the determination is that a number of contiguous free areas that is the same as the number of sectors SC forming the set of sectors SC exist in another track TR, the overwrite processor 63 controls the recording/playback head 21 to write the user data that had been written in the set of sectors SC into the physically contiguous free areas in another track TR (step S412).

If, however, the determination is that a number of physically contiguous free areas that is the same as the number of sectors SC forming the set of sectors SC does not exist in another track TR, the overwrite processor 63 performs processing to defragment (perform disk defragmentation of) the magnetic disk 10 and to increase the number of physically contiguous free areas (step S414).

Next, the overwrite processor 63 determines whether or not a number of physically contiguous free areas that is the same as the number of sectors SC forming the set of sectors SC were created within the same track TR as the abnormal sector SCe (step S416). If the determination is that a number of physically contiguous free areas that is the same as the number of sectors SC of the sectors SC forming the set of sectors SC were created in the same track TR, the overwrite processor 63 performs the processing of step S408.

If, however, the determination is that a number of physically contiguous free areas that is the same as the number of sectors SC forming the set of sectors SC were not created in the same track TR, the overwrite processor 63 performs the processing of step S412. Next, if the processing to write user data into another sector SC has ended, the overwrite processor 63 updates the sector management table 71 and the LBA-address table 72A (step S418), thereby ending the processing of this flowchart.

If, as in the modification example of the first embodiment, a determination is that a number of physically contiguous free areas that is at least the number of sectors in a set of sectors SC including an abnormal sector SCe do not exist in any track TR, the storage device 1C of the fourth embodiment may rewrite the user data that had been written in a set of sectors SC across a plurality of tracks TR that are contiguous in the radial direction of the magnetic disk 10. If, as in the second embodiment, if it is possible to write user data that had been written in the abnormal sector SCe into the same track TR, the storage device 1C may move only the user data that had been written in the abnormal sector SCe into a free area in the same track TR.

Based on the contents of a read command received from the host 100, the storage device 1C according to the fourth embodiment associates data between sectors SC and identifies a set of sectors SC into which data have been written that can be easily accessed simultaneously from the host 100. If any sector SC of the set of sectors SC is determined to be defective, the storage device 1C according to the fourth embodiment writes data that had been written as a set in the set of sectors SC as one clump into physically contiguous sectors SC in the same other track TR. As a result, the storage device 1C according to the fourth embodiment can improve the responsiveness to read commands received from the host 100.

Fifth Embodiment

A storage device 1D according to a fifth embodiment will be described below. The storage device 1D according to the fifth embodiment is different from those according to the first to the fourth embodiments in that the storage medium is a semiconductor memory 270 such as a NAND memory.

Figure 26:
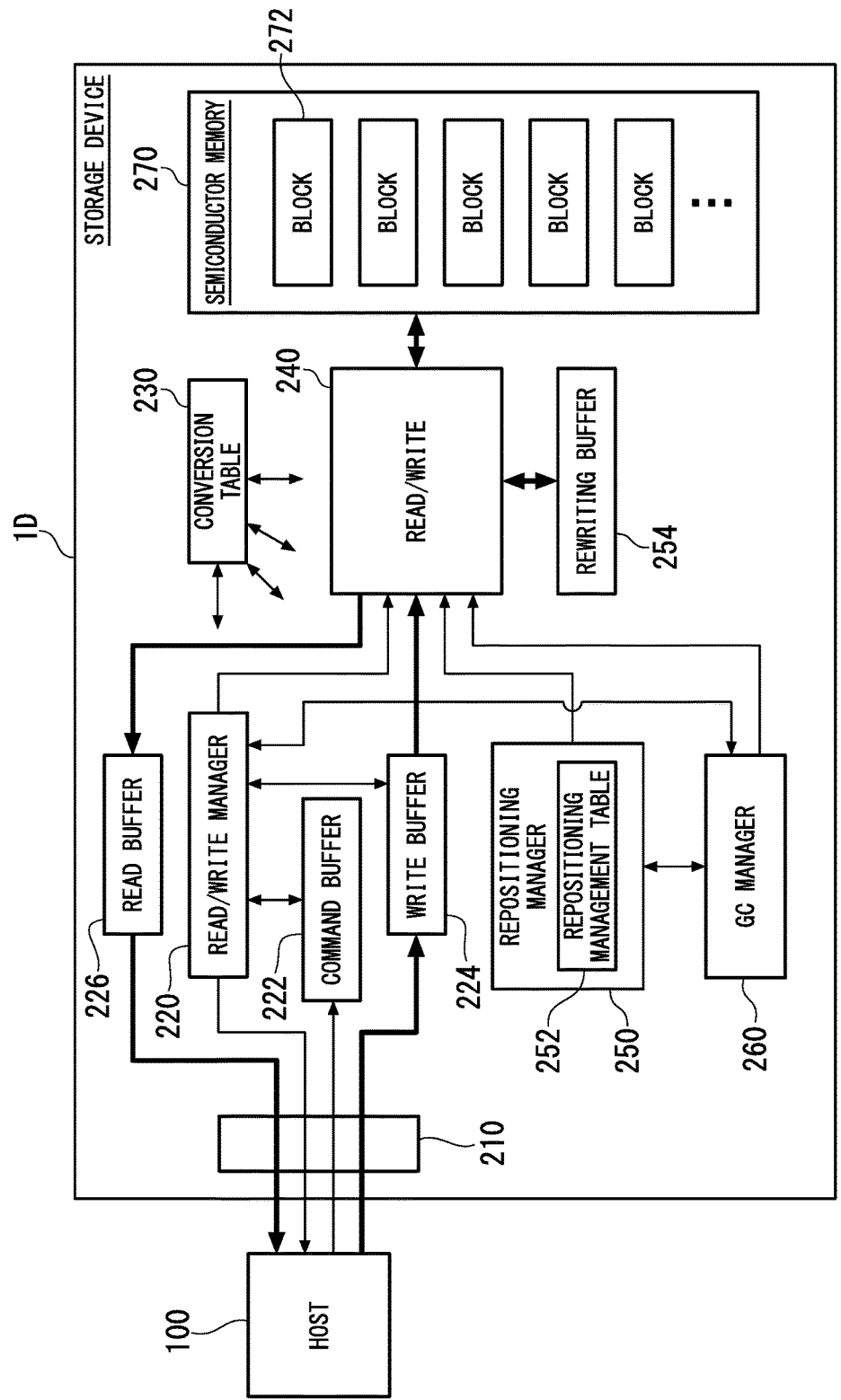
FIG. 26 is a block diagram of a storage device according to a fifth embodiment.

FIG. 26 is a block diagram of the storage device 1D according to the fifth embodiment. Although the storage device 1D may include a host interface 210, a read/write manager 220, a command buffer 222, a write buffer 224, a read buffer 226, a conversion table 230, a read/write module 240, a repositioning manager 250, a repositioning management table 252, a rewriting buffer 254, a garbage collection manager (hereinafter referred to as the GC manager) 260, an access frequency management table 262, and a semiconductor memory 270, the elements of the storage device 1D are not restricted to these elements.

The host interface 210 is connected to the host 100 by a connector and receives various commands from the host 100. A command may be autonomously transmitted from the host 100, or may be transmitted from the host 100 by the storage device 1D requesting the host 100 to transmit the command, in response to a notification from the host 100 (command fetch).

The host 100 in the fifth embodiment, similarly to the above-described first embodiment, may generate commands with respect to the storage device 1D either according to the key-value scheme or the LBA scheme. In the present embodiment, it is assumed that the host 100 generates commands with respect to the storage device 1D according to the key-value scheme.

The read/write manager 220, the read/write module 240, the repositioning manager 250, and the GC manager 260 are implemented by hardware such as an LSI device, an ASIC, an FPGA, or a PLC, which have circuitry for implementing the functions thereof. A part or all of the read/write manager 220, the read/write module 240, the repositioning manager 250, and the GC manager 260 may be implemented by a processor such as a CPU executing a program. A part or all of the read/write manager 220, the read/write module 240, the repositioning manager 250, and the GC manager 260 are an example of a "controller."

The command buffer 222, the write buffer 224, the read buffer 226, the conversion table 230, the repositioning management table 252, and the access frequency management table 262 are formed in a volatile memory (not shown) provided in the storage device 1D. Various types of RAM, such as DRAM (dynamic random-access memory) may be used as the volatile memory. The conversion table 230, the repositioning management table 252, and the access frequency management table 262 are saved in the semiconductor memory 270 when the power to the storage device 1D is shut off and are read out from the semiconductor memory 270 and loaded in the volatile memory when the power is turned on.

The read/write manager 220 controls the read/write module 240 to write data into the semiconductor memory 270 based on write commands received from the host 100 and to read data out from the semiconductor memory 270 based on read commands received from the host 100.

Commands received from the host 100 are stored into the command buffer 222. If a write command is stored into the command buffer 222, the read/write manager 220 sets up a writing area in the write buffer 224 and transmits a data transmission request to the host 100. Upon received the request, the host 100 transmits the data requested to be written (hereinafter, write data) to the storage device 1D. The storage device 1D stores the write data received from host 100 into the write buffer 224. The read/write manager 220 controls the read/write module 240 to write the write data that had been stored in the write buffer 224 into the physical address of the semiconductor memory 270 corresponding to the key appended to the write command. Rather than acquiring the write data in this form, the storage device 1D may receive a command to which the data is appended from the start.

In contrast, if a read command is stored in the command buffer 222, the read/write manager 220 controls the read/write module 240 to read out data from the physical address of the semiconductor memory 270 corresponding to the key appended to the read command and to write that data into the read buffer 226.

Figure 27:
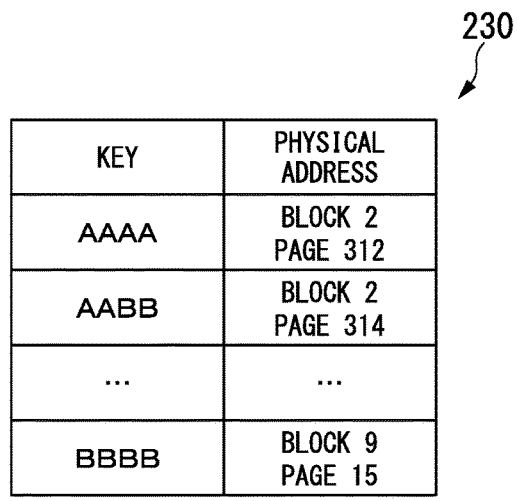
FIG. 27 shows an example of a conversion table employed in the storage device according to the fifth embodiment.

FIG. 27 shows an example of the conversion table 230. The conversion table 230 is a table for performing mutual conversion between keys included in commands and physical addresses in the semiconductor memory 270. A physical address may be expressed as block number or a page number, but is not restricted to these.

If the relationship between the physical address and the key changes after the writing of data into the semiconductor memory 270, the read/write manager 220 or the read/write module 240 updates the conversion table 230. The storage device 1D may include one conversion table 230, or may redundantly include a plurality of conversion tables 230.

The read/write module 240 includes an error correction circuit, a DMA controller, and an interface circuit that interfaces to the semiconductor memory 270. The read/write module 240 writes data that had been stored in the write buffer 224 into the semiconductor memory 270 and reads out data written in the semiconductor memory 270 and writes the data into the read buffer 226.

When the read/write module 240 writes data into the semiconductor memory 270, the read/write module 240 appends an error correction code to the data. The read/write module 240 reads out data written in the semiconductor memory 270 and performs error correction, based on the error correction code of the read-out data.

For example, the read/write module 240 uses the error correction code to detect an error in data for each prescribed data size unit, such as bit units or byte units, so as to correct the data in which an error was detected.

If the read/write module 240 detects an error in the data, the read/write module 240 notifies the repositioning manager 250 of information indicating that a data error has occurred.

The repositioning manager 250 includes the repositioning management table 252. In this case, although the semiconductor memory 270 may be a NAND memory, it is not restricted to this. The semiconductor memory 270 includes a plurality of blocks 272, which are the units for data deletion. The writing of data in the semiconductor memory 270 is done in units of clusters. The clusters may be the same size as a page in the NAND memory, or may be a difference size.

Figure 28:
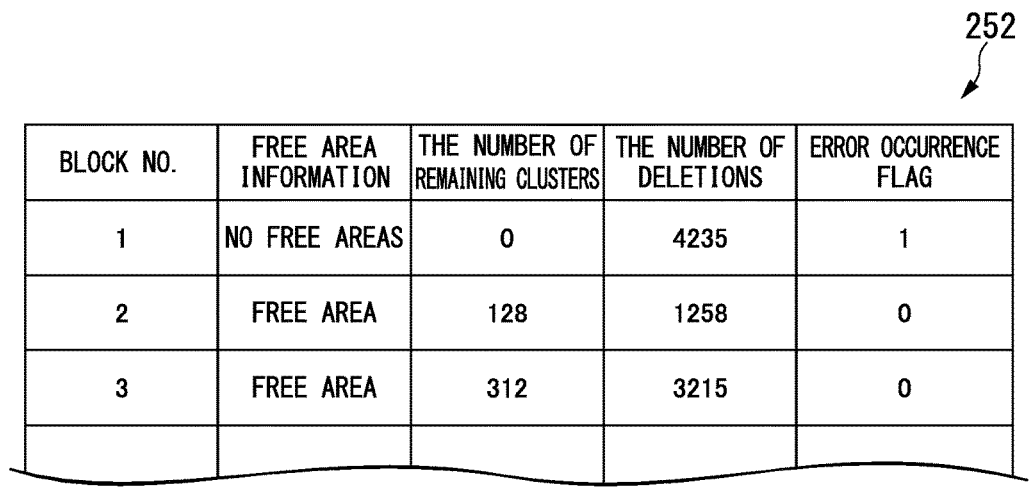
FIG. 28 shows an example of a repositioning management table employed in the storage device according to the fifth embodiment.

FIG. 28 shows an example of the repositioning management table 252. The repositioning management table 252 may be a table in which information such as "free area information" indicating whether or not there is a free area in the storage area within the block number 272, an "remaining cluster count" indicating the number of clusters into which writing can be done, a "number of deletions" indicating the number of times deletion has been done, and an "error occurrence flag" indicating that an error occurred at the time of data readout are associated with the block number identifying the block 272. In the fifth embodiment, a "free area" refers to one or more pages (free sectors) or cells (free cells) into which data can be written.

Each item in the repositioning management table 252 is updated by the repositioning manager 250, based on information of which notification is made from the various constituent elements of the storage device 1D.

The repositioning manager 250 performs refreshing and wear levelling. Refreshing is processing to rewrite data that had been written into a target block 272 into another block 272. For example, if the error occurrence flag indicates that an error has occurred, the repositioning manager 250 refreshes the block 272. If an error correction has been performed by the read/write module 240, the error occurrence flag is updated by the repositioning manager 250 upon receiving a notification from the read/write module 240. When refreshing is done, the error occurrence flag of the target block 272 is cleared (for example, is returned to 0). The refreshing may be processing of rewriting data that had been written in a page of the target block 272 into another page.

Wear levelling is processing to equalize the number of overwrites, the number of deletions, or the amount of time since a deletion between blocks 272 or between memory elements. Wear levelling may be executed in order to select the writing destination of data appended to a write commands and in order to reposition already-stored data, which is not related to a write command.

Also, wear levelling may be processing to equalize the number of overwrites, the number of deletions, or the amount of time since a deletion between pages within each block 272.

Returning to FIG. 26, if the above-described refreshing, wear levelling, or garbage collection to be described below, is executed, the rewriting buffer 254 stores the data that are read out from the semiconductor memory 270 and will be written again into the semiconductor memory 270.

In the process of reading out data by controlling the read/write manager 220 or performing the above-noted wear levelling or refreshing, the repositioning manager 250 determines whether or not an error has been detected in the page or cell of each block 272. In the following, a page in which an error has been detected may be referred to as an abnormal page, and a cell in which an error has been detected may be referred to as an abnormal cell.

If, for example, the data could not be read out as a result of trying to read data from the same page or cell an established two or more times during an established amount of time, the repositioning manager 250 may determine that an error has been detected in that page or that cell.

If, for example, as a result of error correction by the read/write module 240 based on an error correction code, the number of errors in the data corrected by error correction is at least a threshold, the repositioning manager 250 may determine that an error has been detected in that page or that cell. That is, the state in which an error has been detected may be a state in which error correction has been executed an established number of times of one or more in a prescribed data size, such as bit units or byte units.

The read/write module 240 counts and stores in a volatile memory the number of errors in corrected data when error correction is performed. The repositioning manager 250 references this information stored in the volatile memory and acquires the number of errors in corrected data.

If garbage collection is performed by the GC manager 260, to be described later, the repositioning manager 250 may determine whether or not an error has been detected in a page or a cell.

The GC manager 260 performs processing (garbage collection) to move the data that had been stored in at least one block 272 to another area and to erase the data that had been stored in the movement source block 272.

If the storage device 1D receives a write command from the host 100, the GC manager 260 determines whether or not to execute garbage collection, and the garbage collection manager 260 may execute garbage collection without regard to the receiving of a command from the host 100.

Garbage collection is the repositioning of data (valid data) within a block, so as to clump together data that had been fragmented.

For example, the GC manager 260 references the free area information in the repositioning management table 252 and has the read/write module 240 read out data from within a block 272 and write the read-out data into the repositioning buffer 254. Next, the GC manager 260 writes the data that had been written into the repositioning buffer 254 into a block 272 that is different from the block 272 that was the target of data readout. The GC manager 260 then frees and erases the block 272 from which data were read out. This processing to do deletion may be performed if there is a data write instruction after the area is freed.

If the read/write module 240 performs error correction and a data error is detected during the execution of garbage collection, the read/write module 240 notifies the repositioning manager 250 of information indicating that a data error has occurred.

Figure 29:
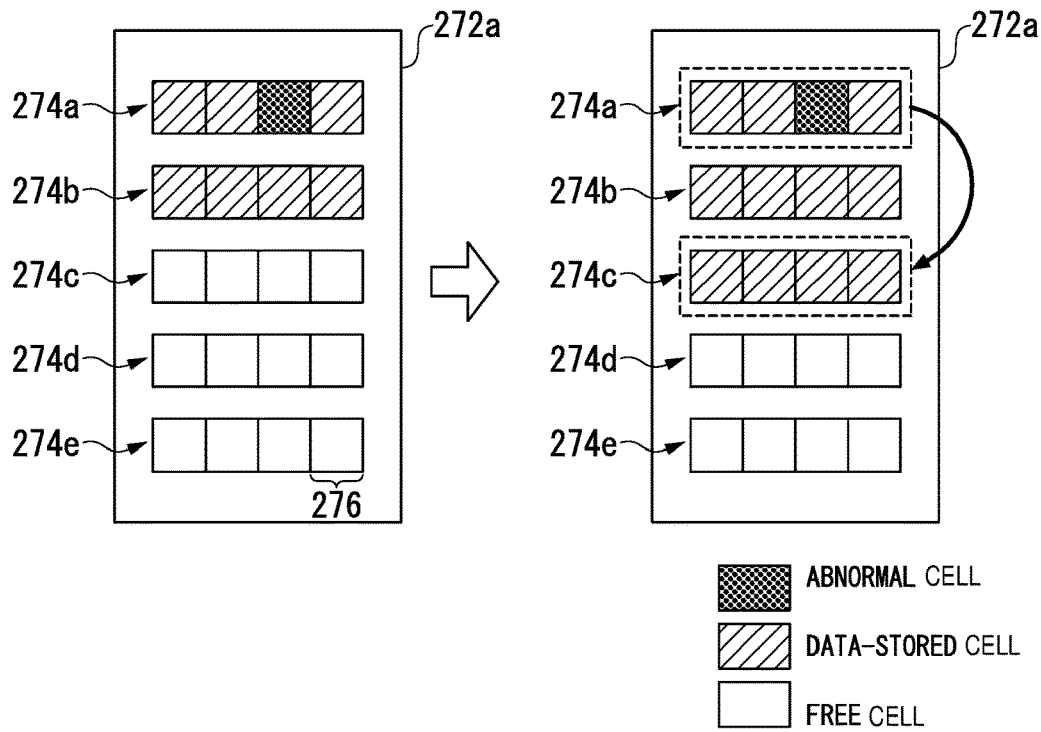
FIG. 29 shows processing of writing a data group that had been written in a page including an abnormal cell into another page.

FIG. 29 shows the processing to write a data group that had been written into a page including an abnormal cell into another page. This processing may be executed as part of wear levelling.

For example, if error correction was done by the read/write module 240 with respect to data read out from a given cell 276 belonging to a page 274a of the block 272a, the repositioning manager 250 writes the data group that had been written in the page 274 including the cell 276 into which data that had been error-corrected was stored (hereinafter, referred to as an abnormal cell) into another page of the same block 272. The data group in this case is a set of data that had been stored in each cell 276 of the page 274. In FIG. 29, the repositioning manager 250 writes the data group written in the page 274a that includes the abnormal cell 276 into the page 274c of the same block 272a.

Figure 30:
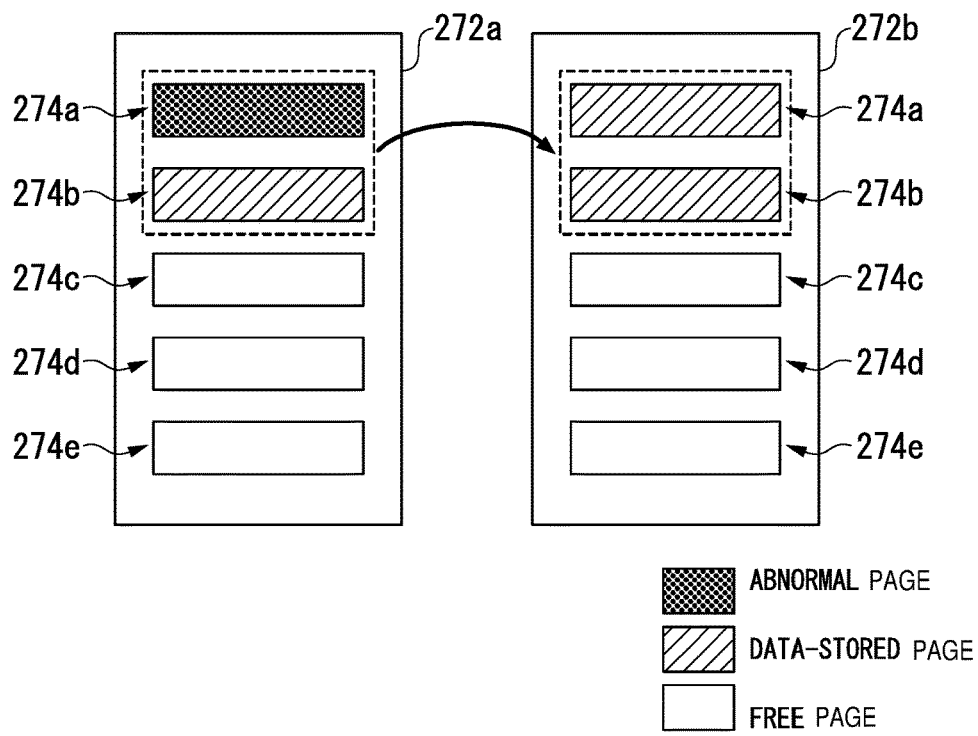
FIG. 30 shows processing of writing a data group that had been written into a block including an abnormal page into another block.

FIG. 30 shows the processing to write a data group that had been written into a block including an abnormal page into another block. This processing may be executed as part of refreshing, wear levelling, or garbage collection.

For example, if the read/write module 240 performs error correction with respect to any data of a data group that was read out from a page 274 of the block 272, the repositioning manager 250 rewrites the data group written in the block 272 including the page 274 storing the data group that was error-corrected (hereinafter, referred to as an abnormal page) into another block 272. The data group in this case is a set of data that had been stored in each page 274 of the block 272. In FIG. 30, the repositioning manager 250 writes the data group written in the block 272a that includes the abnormal page 274a into the pages 274a and 274b of the block 272b.

Because the storage device 1D in the fifth embodiment moves data of the block 272 including a page 274 in which an error was detected, or data of the page 274 including a cell 276 in which an error was detected to another block 27 or another page 274, respectively 2, it is possible to facilitate data management.

At least one of the storage devices according to above-described embodiments writes a data group including at least a first data that is at least a part of data that has been written in a storage area in which an error was detected and a second data that is at least a part of data that has been written in a storage area that is physically contiguous with the storage area in which an error was detected into at least one storage area different from the storage area in which an error was detected, thereby enabling an improvement of the responsiveness with respect to read commands received from the host 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
a storage disk including a plurality of tracks each of which includes a plurality of sectors;
a head configured to write data in and read data from the storage disk; and
a controller configured to
control the head to carry out reading of a group of data units from target sectors in a target track of the storage disk, the group of data units being associated with a command received from an external device,
determine whether or not the target sectors include one or more defective sectors based on result of the reading, and
control the head to write the group of data units in physically consecutive non-written sectors of the target track or another track, when the target sectors are determined to include the defective sectors,
wherein the controller is further configured to
determine whether or not the target track includes at least N physically consecutive non-written sectors, where N is greater than or equal to the number of the target sectors, and if so, to control the head to write the group of data units in physically consecutive non-written sectors of the target track.

2. The storage apparatus according to claim 1, wherein the controller is configured to control the head to write the group of data units in physically consecutive non-written sectors of another track if the target track does not include at least N physically consecutive non-written sectors.

3. The storage apparatus according to claim 2, wherein the controller is configured to determine whether or not a track that is physically adjacent to the target track includes at least N physically consecutive non-written sectors, where N is greater than or equal to the number of the target sectors, and if so, to control the head to write the group of data units in physically consecutive non-written sectors of the physical adjacent track.

4. The storage apparatus according to claim 1, wherein the controller is further configured to control the head to write the group of data units in physically consecutive non-written sectors of the target track and of another track that is physically adjacent to the target track.

5. The storage apparatus according to claim 1, wherein the controller determines a sector to be defective if a data unit stored therein is read by performing more than a threshold number of read operations.

6. The storage apparatus according to claim 1, wherein the controller is further configured to maintain a mapping between an identification or a logical address of the data to be read and a physical location of the storage disk, and specifies the group of data units associated with the command by referring to the mapping.

7. The storage apparatus according to claim 1, wherein the controller is further configured to control the head to write, in the physically consecutive non-written sectors, one or more other data units that are frequently read along with the group of data units.

8. A storage apparatus comprising:
a storage disk including a plurality of tracks each of which includes a plurality of sectors;
a head configured to write data in and read data from the storage disk; and
a controller configured to
control the head to carry out reading of a group of data units from target sectors in a target track of the storage disk, the group of data units being associated with a command received from an external device,
determine whether or not the target sectors include one or more defective sectors based on result of the reading, and
control the head to write the data units stored in the defective sectors in non-written sectors of the target track, if available, or otherwise, in non-written sectors of another track, when the target sectors are determined to include the one or more defective sectors.

9. The storage apparatus according to claim 8, wherein the controller is further configured to control the head to write the group of data units in physically consecutive non-written sectors of another track, the number of non-written sectors of the target track is less than the number of the defective sectors.

10. The storage apparatus according to claim 9, wherein the controller is further configured to control the head to write, in the physically consecutive non-written sectors, one or more other data units that are frequently read along with the group of data units.

11. The storage apparatus according to claim 9, wherein the another track is physically adjacent to the target track.

12. The storage apparatus according to claim 8, wherein the controller determines a sector to be defective if a data unit stored therein is read by performing more than a threshold number of read operations.

13. The storage apparatus according to claim 8, wherein the controller is further configured to maintain a mapping between an identification or a logical address of the data to be read and a physical location of the storage disk, and specifies the group of data units associated with the command by referring to the mapping.

14. A method for storing data in a storage apparatus including a storage disk including a plurality of tracks each of which includes a plurality of sectors, the method comprising:
carrying out reading of a group of data units from target sectors in a target track of the storage disk, the group of data units being associated with a command received from an external device;
determining whether or not the target sectors include one or more defective sectors based on result of the reading;
writing the group of data units in physically consecutive non-written sectors of the target track or another track, when the target sectors are determined to include the defective sectors; and
determining whether or not the target track includes at least N physically consecutive non-written sectors, where N is greater than or equal to the number of the target sectors, wherein
if the target track includes at least N physically consecutive non-written sectors, the group of data units is written in physically consecutive non-written sectors of the target track.

15. The method according to claim 14, wherein
if the target track does not include at least N physically consecutive non-written sectors, the group of data units is written in physically consecutive non-written sectors of another track.

16. The method according to claim 14, further comprising:
if the target track does not include at least N physically consecutive non-written sectors, determining whether or not another track includes at least N physically consecutive non-written sectors, and if not, carrying out defragmentation of data stored in the storage disk to free up at least at least N physically consecutive non-written sectors.

17. The method according to claim 14, wherein the group of data units is written in physically consecutive non-written sectors of the target track and of another track that is physically adjacent to the target track.

18. The method according to claim 14, wherein a sector is determined to be defective if a data unit stored therein is read by performing more than a threshold number of read operations.

* * * * *